United States Patent
Alaimo et al.

(10) Patent No.: US 6,614,811 B1
(45) Date of Patent: Sep. 2, 2003

(54) MODULAR MULTI-SERVICE TELECOMMUNICATION ACCESS DEVICE

(75) Inventors: S. Christopher Alaimo, Boulder, CO (US); Kenneth M. Stevens, Boulder, CO (US); Mark Millican, Longmont, CO (US); Phillip D. Clark, Boulder, CO (US); Craig Steven Cambier, Louisville, CO (US); Susan I. English, Boulder, CO (US); Bharat S. Shah, Aurora, CO (US)

(73) Assignee: Carrier Access Corporation, Boulder, CO (US)

( * ) Notice: Subject to any disclaimer, the term of this patent is extended or adjusted under 35 U.S.C. 154(b) by 0 days.

(21) Appl. No.: 09/412,875

(22) Filed: Oct. 5, 1999

(51) Int. Cl.[7] .............................................. H04L 12/28
(52) U.S. Cl. ...................................... 370/498; 370/537
(58) Field of Search ................................ 370/458, 498, 370/503, 509, 260, 377, 463, 537

(56) References Cited

U.S. PATENT DOCUMENTS

| | | | | |
|---|---|---|---|---|
| 4,382,295 A | * | 5/1983 | Moffitt et al. ................ | 370/260 |
| 5,046,067 A | * | 9/1991 | Kimbrough ................. | 370/377 |
| 5,212,688 A | * | 5/1993 | Gerbehy et al. ............ | 370/509 |
| 5,740,241 A | | 4/1998 | Koenig et al. | |
| 5,784,377 A | * | 7/1998 | Baydar et al. .............. | 370/463 |
| 5,870,466 A | | 2/1999 | Koenig et al. | |
| 5,881,148 A | | 3/1999 | Koenig et al. | |
| 6,208,627 B1 | * | 3/2001 | Menon et al. .............. | 370/328 |

\* cited by examiner

Primary Examiner—Wellington Chin
Assistant Examiner—William Schultz
(74) Attorney, Agent, or Firm—Holland & Hart LLP

(57) ABSTRACT

A modular multi-service telecommunication access device includes a controller card and card slots for six peripheral cards and a power supply. Any of several types of peripheral cards can be inserted into the six card slots. A card present/protocol scheme allows an inserted card to recognize its address and communicate same as well as its communication protocol to the controller card via a PCM highway. The controller card sends both signaling information and management information to the peripheral cards via another PCM highway. A unique communication protocol allows for both real time signaling information and non-real time management information to be sent on the same channel. A microprocessor on the controller card includes an algorithm for managing messages to the various peripheral cards in the various card slots. A unique tributary addressing scheme allows for a simplified address used by external users to be converted to a more detailed internal address. A battery sense circuit includes a variable resistive element used in conjunction with additional circuitry to sense conditions relevant to the battery. A unique ringer circuit includes a boost converter for producing a sufficiently high voltage for the circuit. A faceplate provided on each of the circuit cards has resilient fingers thereon for selective mating with the chassis of telecommunication device.

6 Claims, 20 Drawing Sheets

| BIT | (MSB) 7,6,5,4 | 3 | 2,1,0 (LSB) |
|---|---|---|---|
| MEANING | Rx A,B,C,D SIG. BITS | SIGNALING/!MGMT | CHANNEL # |
| VALUES | C,D ALLOW FOR ENCODING OF TR08 TOGGLING STATES | 0 = MANAGEMENT BYTE<br>1 = SIGNALING BYTE | 0 THRU 7 ENCODES EIGHT CHANNELS |

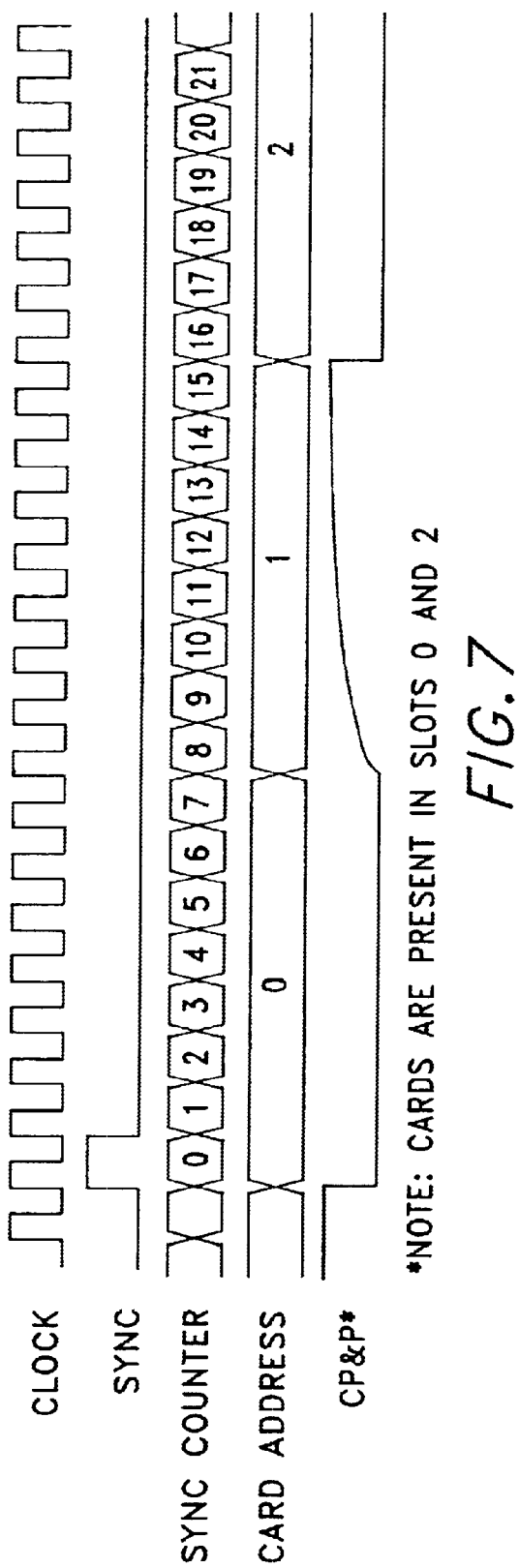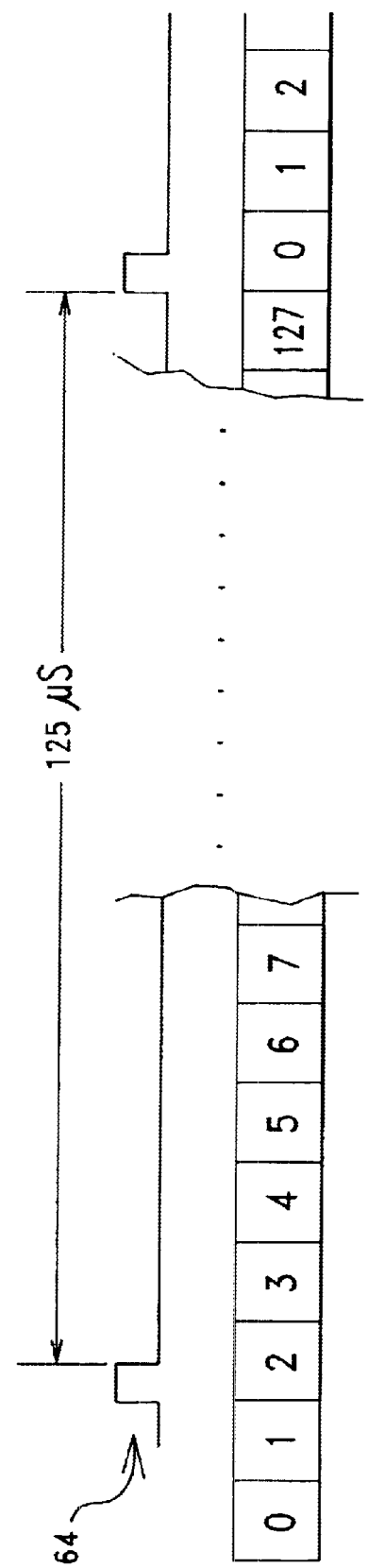

FIG. 9

| 7 | 6 | 5 | 4 | 3 | 2 | 1 | 0 |
|---|---|---|---|---|---|---|---|

FIG. 10

| BIT | (MSB) 7,6,5,4 | 3 | 2,1,0 (LSB) |
|---|---|---|---|
| MEANING | Rx A,B,C,D SIG. BITS | SIGNALING/!MGMT | CHANNEL # |
| VALUES | C,D ALLOW FOR ENCODING OF TR08 TOGGLING STATES | 0 = MANAGEMENT BYTE<br>1 = SIGNALING BYTE | 0 THRU 7 ENCODES EIGHT CHANNELS |

TABLE 2: SIGNALING BYTE FROM VOICE CARD CONTROLLER

FIG. 11

| BIT | (MSB) 7,6 | 5,4 | 3 | 2,1,0 (LSB) |
|---|---|---|---|---|
| MEANING | Tx A,B SIG. BITS | RB AND QC | SIGNALING/!MGMT | CHANNEL # |
| VALUES | A,B ARE SENT OUT TO NETWORK | RINGBACK ON/OFF AND QUIET CHANNEL ON/OFF | 0 = MANAGEMENT BYTE<br>1 = SIGNALING BYTE | 0 THRU 7 ENCODES EIGHT CHANNELS |

| BIT | (MSB) 7,6,5,4 | 3 | 2 | 1 | 0 (LSB) |
|---|---|---|---|---|---|
| MEANING | DATA NIBBLE | SIGNALING/!MGMT | PACKET TYPE | PACKET PROGRESS | TOGGLE BIT |
| VALUES | A NIBBLE IN A MANAGEMENT PACKAGE | 0 = MANAGEMENT BYTE<br>1 = SIGNALING BYTE | 0 = COMMAND<br>1 = REQUEST | 0 = DONE<br>1 = PKT. IN PROGRESS | BIT TOGGLES TO TO INDICATE NEW DATA; ALLOWS SOFTWARE TO BE MUCH SLOWER THAN HARDWARE |

FIG.12

| BIT | (MSB) 7,6,5,4 | 3 | 2 | 1 | 0 (LSB) |
|---|---|---|---|---|---|
| MEANING | DATA NIBBLE | SIGNALING/!MGMT | PACKET TYPE | PACKET PROGRESS | TOGGLE BIT |
| VALUES | A NIBBLE IN A MANAGEMENT PACKAGE | 0 = MANAGEMENT BYTE<br>1 = SIGNALING BYTE | 0 = VOLUNTEER<br>1 = REPLY | 0 = DONE<br>1 = PKT. IN PROGRESS | BIT TOGGLES TO TO INDICATE NEW DATA; ALLOWS SOFTWARE TO BE MUCH SLOWER THAN HARDWARE |

FIG.13

| | CH.3<br>A B C D | CH.2<br>A B C D | CH.1<br>A B C D | CH.0<br>A B C D |
|---|---|---|---|---|
| CARD 1 | CH.7<br>A B C D | CH.6<br>A B C D | CH.5<br>A B C D | CH.4<br>A B C D |
| CARD 2 | | | | |
| | | | | |
| CARD 3 | | | | |
| | | | | |
| CARD 4 | | | | |
| | | | | |
| CARD 5 | | | | |
| | | | | |
| CARD 6 | | | | |
| | CARD 2<br>7 6 5 4 3 2 1 0 | | CARD 1<br>7 6 5 4 3 2 1 0 | |
| | CARD 4<br>7 6 5 4 3 2 1 0 | | CARD 3<br>7 6 5 4 3 2 1 0 | |
| | CARD 6<br>7 6 5 4 3 2 1 0 | | CARD 5<br>7 6 5 4 3 2 1 0 | |

| ITEM | SIZE IN BYTES | DESCRIPTION |
|---|---|---|
| NUMBER OF ENTRIES | 1 | NUMBER OF ENTRIES INCLUDING SLOT NUMBER |
| SLOT NUMBER | 1 | SLOT NUMBER |
| TRIBUTARY 1 TYPE & NUMBER | 1, 1 | TRIBUTARY 1 TYPE, OC3, OC1, DS1, DS0 ETC. AND ITS NUMBER |
| TRIBUTARY 2 TYPE & NUMBER | 1, 1 | TRIBUTARY 2 TYPE, OC3, OC1, DS1, DS0 ETC. AND ITS NUMBER |
| ... | 1, 1 | ... |

FIG.18

OC3 = 1     OC1 = 2     STS1 = 3     VT1.5 = 4.     DS1 = 5     DS0 = 6

(ENTRIES, SLOT, TRIBUTARY TYPE, TRIBUTARY NUMBER)

| PHYSICAL ADDRESS | INTERNAL ADDRESS (HEX) |
|---|---|
| SLOT1 | 00, 01 |
| SLOT1+OC31 | 01, 01, 01,00 |
| SLOT1 − OC11 | 01, 01, 02,00 |
| SLOT2 − STS12 | 01, 02, 03,01 |
| SLOT1 − VT1.512 | 01, 01, 04,0B |
| SLOT1 − STS12 − VT1.520 | 02, 01, 03,01, 04,13 |
| SLOT2 − VT1.51 | 01, 02, 04,00 |
| SLOT3 − DS118 | 01, 03, 05,11 |
| SLOT3 − DS118 − DS024 | 02, 03, 05,11, 06,17 |
| SLOT0 − DS12 − DS024 | 02, 00, 05,01, 06,17 |

FIG.19

MODULAR MULTI-SERVICE TELECOMMUNICATION ACCESS DEVICE

The present invention relates to telecommunication access devices and in particular, the present invention relates to a modular device that is configurable to achieve any of several different types of functionality and that has improved circuitry and mechanical features.

BACKGROUND OF THE INVENTION

With the increased use of telecommunications circuits such as telephone lines to communicate video and data within computer networks, data between facsimile machines, and other telecommunication applications, there is an increased need for various telecommunication devices to perform the necessary telephone switching, multiplexing of signals, interfacing, converting between various data formats, control of other equipment, and so forth. As the amount of data passed between various users increases, even greater demands are placed on such telecommunication equipment.

One type of telecommunication device currently in use is commonly known as a channel bank. A channel bank is a muliplexer which assigns time slots to multiple relatively slower-speed voice or data channels in a single relatively higher-speed link. In a typical situation, a channel bank may multiplex up to 24 different DS-0 channels, each of which represent a single voice conversation digitized at 64 kilobits per second. The 24 DS-0 channels together are multiplexed to create one DS-1 channel passed over a T-1 data link at 1.544 megabits per second. An example of such equipment is sold by the assignee of the present invention, Carrier Access Corporation, as the Access Bank I, and described in part in U.S. Pat. No. 5,881,148. This device includes a single Line Interface Unit card and a pair of channel line cards, with each channel line card handling twelve DS-0 channels.

Another type of telecommunication device is generally known as an integrated access device. Such devices support voice, data, and video information streams over a single, high capacity circuit. An example of an integrated access device is sold by the assignee of the present invention, Carrier Access Corporation, as the Access Bank II.

Taking the example of a start-up business that may begin with a few phone lines. As the number of phone lines grows, it may be necessary to add more channel banks. Eventually, it will be desired to have additional lines for fax and computer traffic, and more or different equipment may be necessary. As the business grows in size additional telephones may be needed and the small business may elect to utilize a private branch exchange or PBX. A PBX allows for a greater number of internal telephones and telephone lines than there are outside lines. The business may eventually acquire a T-1 line to carry all or portions of its voice and data traffic. A channel bank may be purchased to connect the telephone lines to the T-1 line. An integrated access device may later be purchased to route data to external routers and voice lines to an internal PBX. As the company continues to grow, its voice and data needs do as well, and additional equipment will continually have to be purchased. There is a need for telecommunication equipment that is flexible enough so that the user can configure and use the device for any of a variety of applications.

Turning now to issues arising within telecommunication devices, there are many such devices that are configured in a master/slave relationship. These may include devices with a controller card that controls the function of each of two or more other circuit cards. These circuit cards may process relatively lower speed data than the data processed on the controller card, for example. This control by the controller card of the circuit cards has typically taken place over large address and data buses connected to each circuit card. In fact, in many cases, there are dedicated buses between each circuit card and the controller. Of course, this control data passed between the circuit cards and the controller card is in addition to the non-control data passed between the circuit cards and the controller cards, such as the voice channels in the telephone network and the data channels between computers in a computer network.

Because of all the control data and non-control data passed between circuit cards and controller cards, there is a need for a great deal of input/output resources on the controller card and the circuit cards. Typically, these resources, such as external connectors, are located on the front edge or back edge of the controller and circuit cards. Unfortunately, the front edge of such cards is also the location where mechanical devices are typically located for fastening the controller cards and circuit cards within the housing or card cage of the telecommunication device.

Certain telecommunication devices include the capability for circuit cards therewithin to be removed and inserted while the device is operating, or "hot-swapped". In such systems, it is desirable to have a reliable means to sense that a card is present in a particular slot in a telecommunication device versus whether a card is missing from that slot. In addition, it is desirable to sense that the right type of card has been inserted in that slot. It is then desirable to be able to efficiently communicate with the circuit cards.

Another issue, in the case of a controller card that communicates with voice cards such as FXS or FXO cards, is that it is necessary to pass signaling information between the controller and voice cards for various phone line states, such as ringing, off hook, and so forth. This needs to be done with as little delay and as near to real time as is possible. Fortunately, the number of bits of information that needs to be sent is relatively small. Also, there is a need to pass relatively larger amounts of control and status information between the controller and voice cards. Fortunately, this information is not real time and can be sent much more slowly than the signaling information. Typically, because of the different demands of passing these two different types of information, different buses have been used for each.

It is also desirable to develop improved circuitry for ringer circuits and for circuits for monitoring the condition of back-up batteries associated with telecommunication devices.

Lastly, it is desired to improve on the prior art schemes for latching circuit cards into circuit card housings. Typically this has been handled with pivotally-mounted retaining latches (also known as PCB extractors) that are mounted to a front edge of the circuit card and can be engaged with mating surfaces on the housing. Unfortunately, such approaches have some drawbacks. First of all, for high volume cards the cost of the these retaining latches can be excessive. Second, the latches typically mount to the front edge and take up precious real estate where I/O and indicators need to be located. Third, the plastic latches provide no grounding or EMI protection. Fourth, the design requires a two-handed removal or insertion operation. Fifth, multi-piece assemblies such as the latches and the required retaining pins require secondary assembly operations and pose reliability concerns.

It is against this background, and the desire to solve the problems of and improve on the prior art, that the present invention has been developed.

SUMMARY OF THE INVENTION

The present invention is directed to a telecommunication device including a controller circuit, a connector electrically connected to the controller circuit, and a plurality of telecommunication circuits electrically connectable to the connector. Each telecommunication circuit receives control and status information from the controller circuit via a first TDM signal passed through the connector from the controller to the telecommunication circuits and transmits control and status information to the controller circuit via a second TDM signal passed through the connector from the telecommunication circuits to the controller. Each telecommunication circuit determines where in the first TDM signal to find information related to that telecommunication circuit and where in the second TDM signal to insert information-related to that telecommunication circuit based on a location signal received from the connector.

The present invention is also directed to a telecommunication device including a controller circuit and a plurality of telecommunication circuits electrically connectable to the controller circuit. Each telecommunication circuit receives both real time signaling information and non-real time control and status information from the controller circuit in bytes of data via a first TDM signal passed from the controller to the telecommunication circuits and transmits both real time signaling information and non-real time control and status information to the controller circuit in bytes of data via a second TDM signal passed from the telecommunication circuits to the controller. At least one bit in each byte of data indicates whether real time or non-real time information is included therein.

The present invention is also directed to a telecommunication device including a controller circuit with a plurality of card slots operatively associated therewith, the controller circuit including a processor therein and a plurality of telecommunication circuits electrically connectable to the controller circuit via the card slots. The processor includes, residing in software therein, a slot message manager for centralizing communications with each of the telecommunication circuits and a plurality of card managers. Each card manager corresponds to one of the telecommunication circuits, the card managers communicating with the telecommunication circuits through the slot message manager to manage the functionality of the corresponding telecommunication circuit.

The present invention is also directed to a telecommunication device including a controller card with a microprocessor thereon, the microprocessor capable of receiving external commands, the commands being external to the device. The device also includes a backplane in electrical communication with the controller card, the backplane having a plurality of card slots for receiving circuit cards and a plurality of peripheral cards with each peripheral card having one or more tributaries thereon, each peripheral card received within one of the card slots in the backplane. The microprocessor has software residing therein that converts between an external address for one of the tributaries on the peripheral cards and an internal address that is relatively more detailed than the external address, with the internal address being scaleable to accommodate addresses of various lengths.

The present invention is also directed to a circuit for sensing a plurality of conditions of a battery in a telecommunications device. The circuit includes a variable resistive element connected in series with the battery, a discharge monitoring circuit detecting the current flowing out of the battery through the variable resistive element, a charge monitoring circuit detecting the current flowing into the battery through the variable resistive element, a battery present monitoring circuit, coupled to the discharge monitoring circuit and to the charge monitoring circuit, for determining the presence of the battery, and one or more indicators, coupled to the battery present monitor, for providing an indication to a user that the battery is present.

The present invention is also directed to a circuit for converting a first DC supply voltage to a periodic ring signal at a second voltage, in a telecommunications device. The circuit includes a converter for boosting the first supply DC voltage to a higher second voltage level, the boost converter having an input coupled to the first supply voltage at a first node, and a ringer output and a controllable switch having a control line and having one end of the switch coupled to the input of the boost converter at the first node, and the other end of the switch coupled to ground. The circuit also includes a timer generating a periodic control signal having a first state and a second state, the periodic control signal coupled to the control line of the controllable switch and a load dumping stage for controllably shorting the ringer output to a reference voltage, the load dumping stage having a control line coupled to the periodic control signal. When the periodic signal is in the first state, the controllable switch is active and couples the input of the boost converter to ground, thereby enabling the boost converter to provide a boosted ringer output at a level of the second voltage, and in the first state, the load dumping stage is disabled.

The present invention is also directed to a bracket attachable to a circuit board for removably securing the circuit board within a slot of a card cage. The bracket includes a bracket body having a central portion, and a first and a second end portion, wherein the first end portion is coupled to one end of the central portion, and the second end portion is coupled to the other end of the central portion. The bracket also includes a first tab adapted for securement to the circuit board at a first position, the first tab extending inwardly from the first end portion, a second tab adapted for securement to the circuit board at a second position, the second tab extending inwardly from the second end portion, and a finger portion positioned along the first end portion, the finger portion adapted to mate with the card cage to removably secure the circuit board within the card cage.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings;

FIG. 7 is a view of a small slice of time in the timing diagram of the card present/protocol PCM highway of FIG. 4.

FIG. 8 is a timing diagram of one of the control data PCM highways of FIG. 4.

FIG. 9 is a view of the bits in a byte of control data on one of the PCM highways of FIG. 4.

FIG. 10 is a view of the bits in a signaling byte of control data sent on the PCM highway from the controller card to the peripheral card of FIG. 4.

FIG. 11 is a view of the bits in a signaling byte of control data sent on the PCM highway from the peripheral card to the controller card of FIG. 4.

FIG. 12 is a view of the bits in a management byte of control data sent on the PCM highway from the controller card to the peripheral card of FIG. 4.

FIG. 13 is a view of the bits in a management byte of control data sent on the PCM highway from the peripheral card to the controller card of FIG. 4.

FIG. 18 is a table describing the internal tributary addressing format within the microprocessor of the telecommunication device of FIG. 1.

FIG. 19 is a table with a series of examples of external addresses versus internal addresses for tributaries within the microprocessor of the telecommunication device of FIG. 1.

DETAILED DESCRIPTION OF THE PREFERRED EMBODIMENTS

Figure 1:
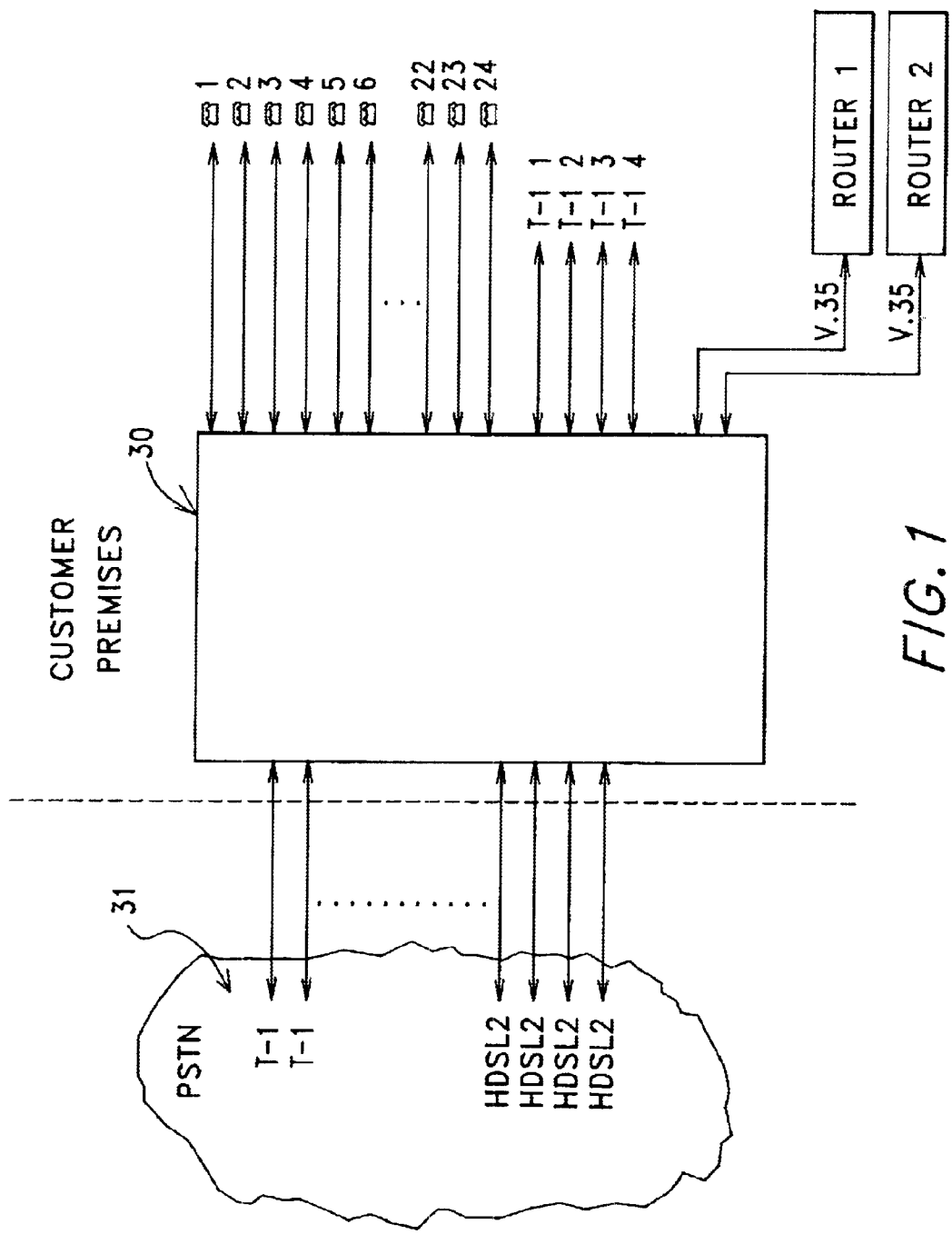
FIG. 1 is a block diagram of a typical application for the telecommunication device of the present invention.

A telecommunication device 30 is shown in FIG. 1. The device 30 can be configured to provide time division multiplexing (TDM) services, frame relay services, ethernet/IP services, as well as many other services. The device 30 can be deployed at any of several different locations and scenarios in a telecommunication network. The example shown in FIG. 1, shows the telecommunication device 30 receiving a variety of higher bandwidth signals from other components of a Public Switched Telephone Network (PSTN) 31. These signals may include one or more HDSL2 lines and one or more T-1 lines. As currently implemented, the telecommunication device can connect to up to 16 T-1 or HDSL2 lines. As shown, the telecommunication device may typically be located at a user's premises, such as in business applications. The telecommunication device 30 is an interface and service provider for any of a variety of types of channels and equipment at the user premises. For example, in one configuration, the telecommunication device 30 can interface to up to 48 different analog telephone lines. In another configuration, the telecommunication device can provide as an output to other equipment within the user premises up to 16 DSX-1 lines. In still another configuration, the telecommunication device 30 can provide up to twelve V.35 lines. The analog telephone lines could connect to standard telephone sets. The DSX-1 lines may connect to channel banks, routers, or a private branch exchange (PBX) at the user premises. The V.35 channels could connect to a router at the user premises. The V.35 channels are used by many small businesses as an internet connection. Alternatively, the telecommunication device 30 could be configured to provide as an output 24 analog telephone lines, four DSX-1 lines, and four V.35 lines. As can be seen, these and many other configurations for the telecommunication device 30 are available. For this reason, the telecommunication device 30 can be called a multi-service access device, which is a step up from an integrated access device.

Figure 2:
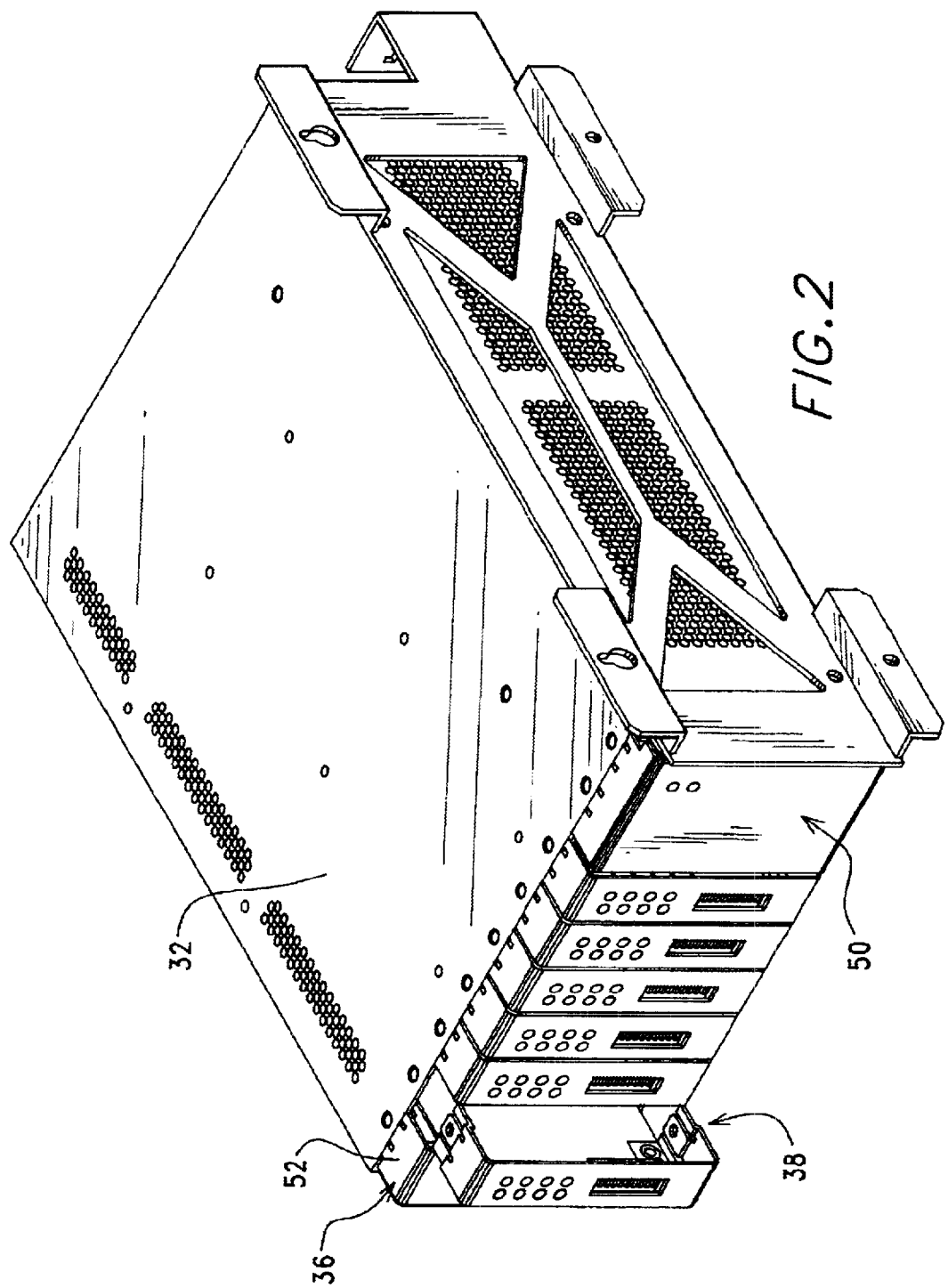
FIG. 2 is a perspective view of the telecommunication device of FIG. 1.
Figure 3:
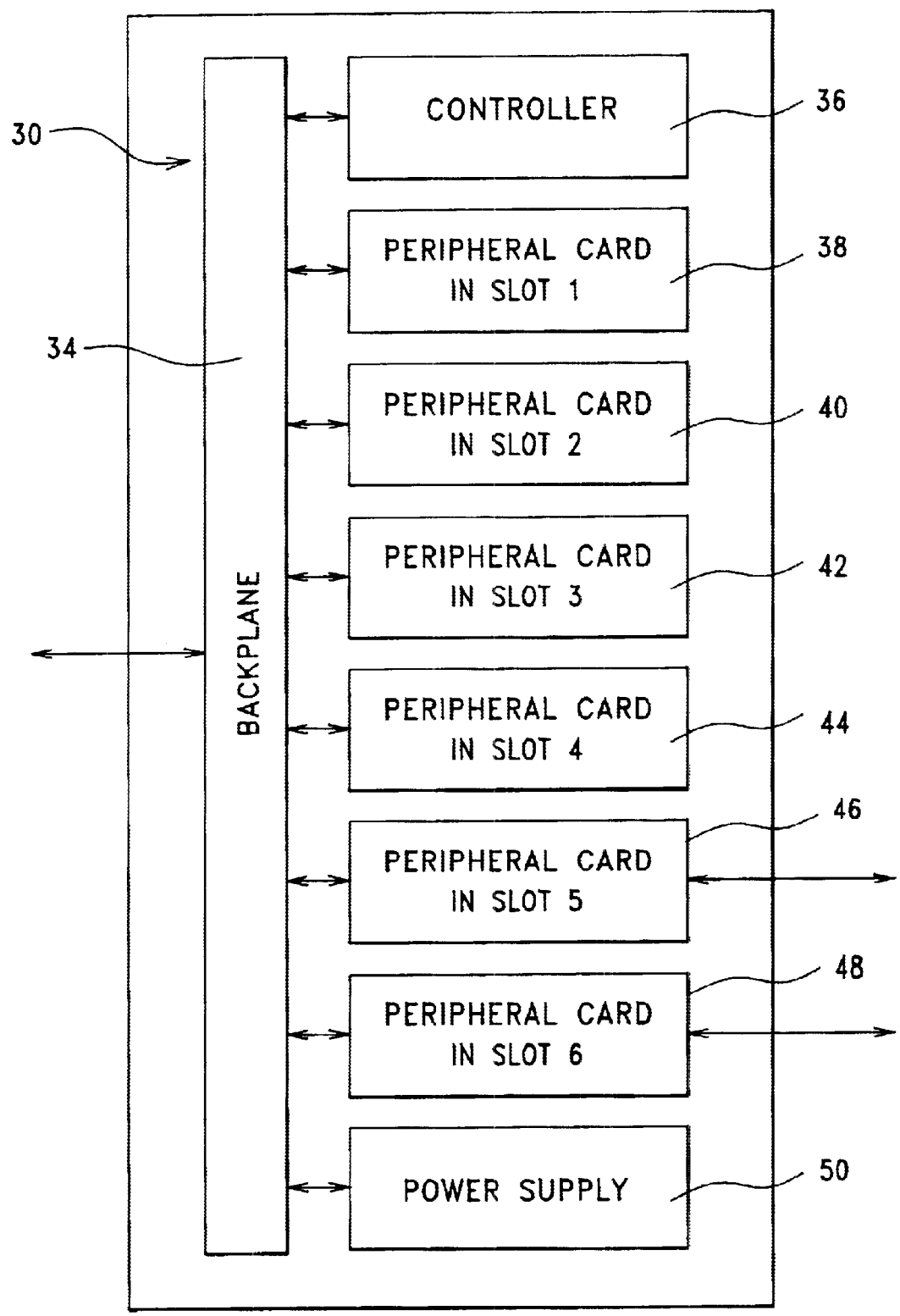
FIG. 3 is a block diagram of the major components of the telecommunication device of FIG. 1.

The telecommunication device 30 includes a housing or card cage 32 containing a backplane 34 that receives and connects to a plurality of cards 36, 38, 40, 42, 44, 46, 48, and 50, as is shown in FIGS. 2 and 3. Each of the cards has a faceplate thereon for mechanically latching to the card cage 32. For example, the card 36 has a faceplate 52 that is shown disengaged from the card cage 32 so that the card 36 can be easily removed.

The telecommunication device 30 is a naturally-cooled unit. Accordingly, the walls of the card cage 32 are perforated (only a small portion of the perforations are shown in FIG. 2) and the faceplates for each of the cards have spaces therebetween to provide for the flow of air. In addition, the telecommunication device 30 is designed so that the cards will be vertically disposed to allow the heat generated by circuitry on the cards to be carried away from the cards by natural convection.

As seen in the block diagram of FIG. 3, the telecommunication device 30 is designed so that all communication between the various eight cards of the device 30 is conducted through the backplane 34. The card 36 is a controller card, while the card 50 is a power supply card. As currently implemented, these physical locations of the controller card 36 and power supply card 50 are fixed relative to the backplane 34. In other words, the backplane expects the power supply card 50 to always be inserted into its particular slot, while the same is true for the controller card 36. The remaining six cards 38, 40, 42, 44, 46 and 48 can be any of a variety of types of circuit; cards. The slots into which these cards are shown inserted in FIG. 2 are referred to as card slot 1, card slot 2, card slot 3, card slot 4, card slot 5, and card slot 6. In other words, as shown in FIG. 2, the card 36 is inserted into card slot 1.

Certain types of cards that can be inserted into card slots 1 through 6 will have all I/O communicated through the backplane such as FXO and FXS cards, because of the standard connectors used with these type of lines. Other types of cards, such as quad T-1 cards can have I/O connections (for T-1 lines) at their front edge through the faceplate thereof, as shown with cards 46 and 48 in FIG. 3.

Card Present/Protocol

Figure 4:
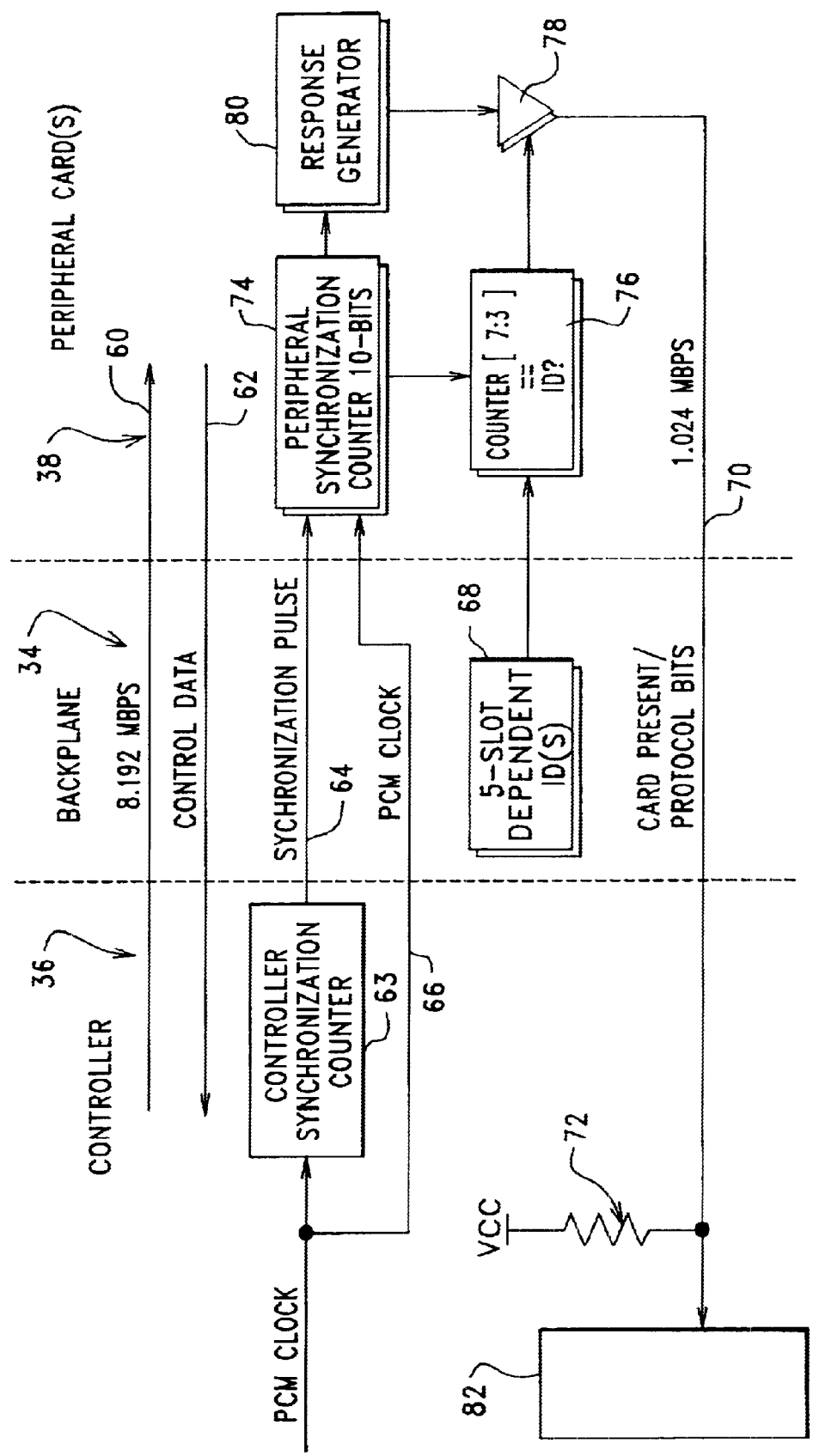
FIG. 4 is a functional block diagram of components on a controller card, backplane, and peripheral card of the telecommunication device of FIG. 1, showing a card present/protocol scheme.

Since any of a variety of types of cards can be inserted into any of the various slots, it is highly desirable for the controller card 36 to be able to detect first of all whether or not a card has been inserted into card slot 1. In addition, it is highly desirable for the controller card 36 to be able to determine the communication protocol that the particular card inserted into a given card slot expects to communicate with. To understand how the controller card 36 detects a card and determines the protocol, reference can be made to FIG. 4.

An 8.192 megabit per second (Mbps) PCM highway 60 is provided from the controller 36, through the backplane 34, to each of the cards 36, 38, 40, 42, 44, 46 and 48. For ease of illustration, throughout the remainder of this description, the communication to the card 38 will be described in detail. The connections to the remaining cards are identical, and detailed descriptions of them will not be provided. Another 8.192 Mbps PCM highway 62 is provided from the card 38, through the backplane 34, to the controller 36. It is important to note that these two PCM highways 60 and 62 connect the controller with each of the six peripheral cards. As will be described below, each card has a specified address which corresponds to the portion in the PCM stream where data relevant to that card is placed.

Figure 5:
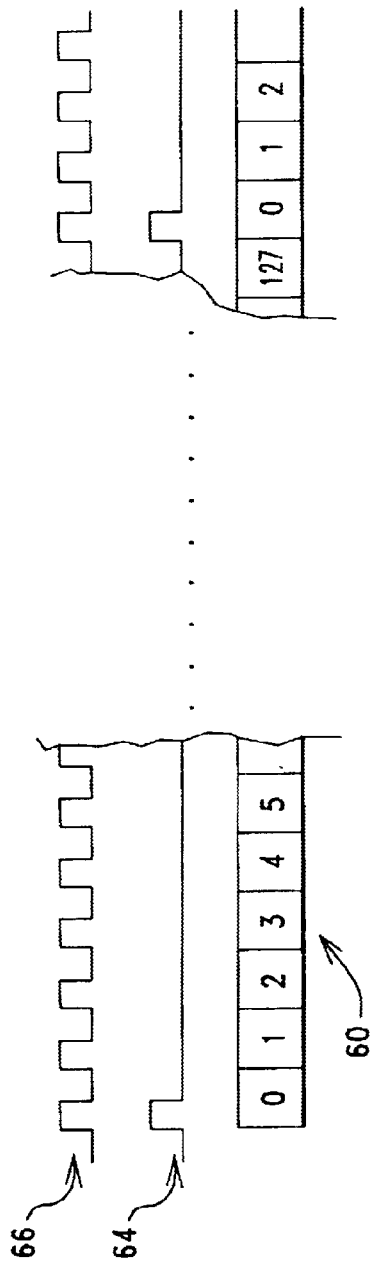
FIG. 5 is a timing diagram of the card present/protocol PCM highway of FIG. 4.

A representative one of the PCM highways 60 and 62 is shown in greater detail in FIG. 5. The PCM highway 60 is shown as having 128 different time slots (numbered 0–127) each of which contain a byte of data in this byte-interleaved PCM highway. To support the PCM highways 60 and 62, a synchronization counter 63 on the controller 36 receives a PCM clock signal 66 and generates a sync pulse 64 therefrom every 125 microseconds. When the sync pulse 64 is received by the card 38, the card 38 recognizes this is the beginning of the time slot for channel 0. The card 38 then begins counting clock pulses from the 8.192 Mbps PCM clock 66 to recognize when each new time slot begins corresponding to the consecutive channels up to channel 127. When the sync pulse is again received, the card 38 recognizes this as the next time slot for channel 0.

When a card is first inserted into the backplane, the card senses a 5-bit slot dependent ID 68, also known as the card slot identifier (CSI). Zeros are indicated in the CSI by grounding the corresponding pin on the backplane 34, while ones are indicated by a no-connect on the backplane 34 that is pulled up by a resistor (not shown) connected to the supply voltage on the card 38. Each card slot has a unique CSI, so that it can be appreciated that with 5 bits of information, up to 32 different card slots can be identified by this identification scheme. While the telecommunication device 30 as currently implemented only provides for the use of interchangeable cards in the six peripheral card slots, the system is easily expandable to 32 card slots with this identification scheme, and expandable to 128 card slots with the 128 channels on the PCM highway 60. In order to expand to the 128 card slots, of course, two additional bits of information in the CSI would have to be provided to the card 38. As can be appreciated, the control signals to each of the peripheral cards from the controller 36 is provided on a single additional pair of wires from the controller 36 and a single pair of additional wires in and out of the peripheral cards 38. This is because the PCM clock and synchronization pulse signals are already provided to each of the cards for the non-control data that operates on four additional 8.192 Mbps PCM highways.

After the peripheral card initially powers up, it syncs up to the PCM highway 60 using the synchronization pulse 64 and PCM clock 66. The card 38 then reads the 5-bit CSI and begins to look for information on the PCM highway at the time slot that corresponds to its particular CSI address. Or course, it is necessary for the card 38 to communicate to the controller 36 that a card is present in card slot 1. In addition, it is desirable for the card 38 to communicate to the controller 36 what the communication protocol is that the card 38 will use to communicate. This is done via a 1.024 Mbps bit-interleaved PCM highway 70. Again, this PCM highway 70 is common to each of the cards in providing the card present and protocol information to the controller 36. The controller 36 includes a pull-up resistor 72 to pull open-ended inputs (in the case of missing cards in various slots) to a high level signal, which the controller interprets as a zero or missing card.

Figure 6:
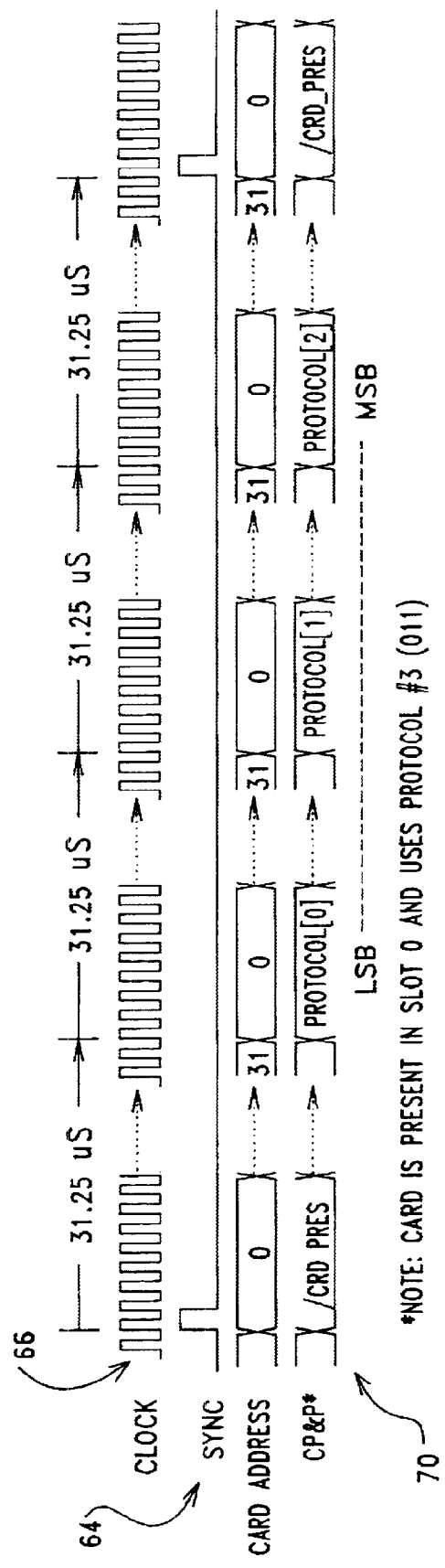
FIG. 6 is a more detailed timing diagram of the card present/protocol PCM highway of FIG. 4.

The card present and protocol scheme is shown best in FIGS. 6 and 7. The code sent from each card to the controller 36 includes four bits, a one bit card present field, and a three-bit card protocol field. As is shown in FIG. 6, at the time of the sync pulse, when the first time slot for card slot (address) 0 begins, the card in card slot 0 will provide a low signal on the PCM highway 70 to indicate that a card is present in that slot. Each of the 32 card address slots sequentially have a chance to indicate the card present bit. Next, the least significant bit of the three-bit card present protocol is provided for card slot 0, as shown in FIG. 6. In this case, a one is provided in that time slot by the card in card address 0. After each of the 32 card address slots have had a chance to present the LSB of the protocol field, each of the cards then sequentially are able to provide the second bit of the three-bit protocol field, and then each of the 32 cards have a chance to provide the most significant bit (MSB) of the card protocol field. In this case, the card in card slot 0 indicated that a card was present and that protocol number three (011) is the communication protocol of choice for the card in that card slot.

A more exploded view of the protocol is shown in FIG. 7. It can be seen how the sync counter 74 on the card 38 counts clock pulses 66 from the sync pulse 64, and it can be seen that eight counts of the clock pulse constitute a time slot for a given card address. In the example shown in FIG. 7, the card present bit is held low by the card in card slot 0. Next, during the time period in which the card in card slot 1 would provide its card present bit, it is seen that the signal starts out at a low level and is pulled to a high level by the pull-up resistor 72 previously discussed. This indicates to the controller card 36, the absence of a card in card slot 1. In the next consecutive card address slot, card slot 2, a card is present and a low signal is provided on the PCM highway 70, and so forth.

Each of the peripheral cards relies only on its internal hardware to provide the card present and protocol information onto the PCM highway 70. The 10-bit counter 74 on each card is used to help the card determine when to provide its card present and protocol information onto the PCM highway 70. The 10-bit counter is clocked by the 8.192 Mbps PCM clock 66 and is configured so that the three least significant bits count off the length of each time slot in the PCM highway 70. Thus, each time slot is eight clock cycles long, as can be seen in FIG. 6. The next five more significant bits are used for comparison to the five-bit CSI address. As implemented with a comparator 76 on each card that takes bits 3 through 7 (with bit 0 being the LSB) and compares it to the CSI. When there is a match, buffer 78 is enabled so that the signal from a response generator 80 can be placed onto the PCM highway 70. The response generator 80 is hardwired to provide first a low signal for the card present and then the three bits of the protocol, using the two most significant bits from the 10-bit counter 74 to determine which of the card present and protocol bits to provide at a given time.

The PCM highway 70 is received on the controller by a state machine 82. The state machine 82 stores the current condition of each of the bits in the PCM highway 70 and generates an interrupt to a microprocessor 84 on the controller when and if the condition of any of the card present and protocol bits for any of the card slots change. In this manner, it is not necessary for the microprocessor to constantly monitor the bits, but instead need only be informed when a card has been inserted or removed.

The microprocessor 84, once it discovers that a new card has been inserted, can use the communication protocol indicated in the PCM highway 70 to communicate with the particular card and interrogate the card to discover the type of card that has been inserted into the given card slot.

As can be seen, the card present/protocol detection scheme described above enables the controller 36 of the telecommunication device 30 to be able to detect that a card has been inserted into a particular slot, determine the communication protocol for communicating with that particular card, and accomplishes all of this with a minimum of wires and pins into the controller. While a common communication protocol to many of the types of cards may be the HDLC communication protocol, it is also possible for other much simpler protocols to be used. For example, in certain high-volume, low-cost cards it may not be desirable to provide an HDLC controller on the card, so there may be cards with a state machine thereon and a counter associated therewith to essentially convert the communication on the PCM highway 60 coming from the controller 36 into address and data bits and create an address and data bus on the card to address the registers and state machine. Furthermore, a similar scheme can be used to pull data out of the registers and state machine and place back onto the PCM highway 62 headed back to the controller 36.

As can be seen, since the PCM highway 60 and 62 are configured to provide 128 different 64 kilobit per second (Kbps) channels, and since the telecommunication device 30 as currently configured only includes six card slots, the PCM highway 60 and 62 are greatly underutilized if a given card only requires 64 Kbps of control data. For this reason, it is possible to provide a much higher amount of control data to any given card, as may be necessary. For example, when the controller 36 begins to communicate with a given card inquiring about the type of card that is in that given slot, that card can inform the controller 36 of its need to receive greater than 64 Kbps of control data. In response, the controller 36 can assign that particular card additional time slots to provide a greater data rate for the control data.

Voice Card Protocol

The control data sent between the controller card 36 and each of the peripheral cards (in this example, card 38) on PCM highways 60 and 62 has a timing sequence as shown in FIG. 8 relative to the sync pulse 64 which have a separation of 125 microseconds. During each 125 microsecond period, 128 eight-bit bytes are transmitted. Each of the 128 bytes corresponds to a particular card slot. Of course, in the implementation of the telecommunication-device 30 described herein, only six card slots are utilized. Each of the eight-bit bytes includes a combination of address, control and data information. FIG. 9 shows the eight-bit byte, with the MSB being bit 7 and the LSB being bit 0. Bit 3 indicates whether the particular byte is a signaling byte or a management byte, with a one indicating that it is a signaling byte, and a zero indicating that it is a management byte.

The voice card protocol described herein allows for near-real time transmission of signaling information, along with less than real time transmission of much slower management information. The nature of signaling information is that it does not require many bits of data, but it must be transmitted very rapidly. The nature of management information is much different, it is much more data intensive but does not need to be transmitted as rapidly as signaling information. As described, it will be apparent that each of the types of information (signaling and management) can be provided in a manner consistent with the nature of that type of information.

More detail on the signaling bytes is provided in FIGS. 10 and 11. FIG. 10 shows a signaling byte from the controller card 36 to the card 38. Bits 0, 1, and 2 provide a three-bit channel number to tell the card 38 which of the eight voice channels (FXS channels or FXO channels) is being addressed. As described previously, bit 3 is the one to indicate that this byte is a signaling byte. The four most significant bits of the signaling byte are received A, B, C, and D signaling bits. The C and D signaling bits allow for encoding of TRO8 toggling states.

FIG. 11 shows a signaling byte from the card 38 to the controller card 36. The meaning of bits 0 through 3 are the same as with the signaling byte described above. In this case, however, since there is no need to send C and D signaling bits to the controller card 36, only the two most significant bits (bits 6 and 7) represent transmit A and B signaling bits. The next two bits (bits 4 and 5) are ringback on/off and quiet channel on/off bits. As can be seen, when a signaling byte is provided, the card receiving the signaling byte has all of the information self-contained within that particular byte to know what to do with it. Thus, that byte can be rapidly inserted into the data output signals from that card.

In the case of the management bytes, the data is sent in four-bit data nibbles. Because the data in the management bytes is of relatively lower priority than the data in the signaling bytes, the controller card 36 and peripheral card 38 apply a relatively lower priority to the transmission of this data. For this reason, two flow control bits are provided to inform the receiver of the management bytes when new data is being provided.

FIG. 12 shows a management byte from the controller card 36 to the card 38. As previously described, bit 3 indicates a zero condition to show that this is a management byte. Bit 2 indicates the packet type and can be a zero to indicate that the management byte is going to contain a command from the controller 36 to the card 38. If bit 2 is a one, then it indicates that the management byte is a request from the controller card 36 to the peripheral card 38. The four most significant bits (bit 4 through bit 7) are the four-bit data nibble. The two least significant bits (bit 0 and bit 1) are the two flow control bits. Bit 1 is the packet progress bit, which indicates a zero when a packet of data is completed and indicates a one when the transmission of a packet is still in progress. Bit 0 is the toggle bit which toggles (or provides an edge) whenever there is new data in the data nibble. This allows the software to be much slower than the hardware.

FIG. 13 shows a management byte from the peripheral card 38 to the controller card 36. It differs from the management byte described above in conjunction with FIG. 12, only in the respect that the packet type bit is a zero to indicate that the voice card 38 is volunteering information without a request from the controller card 36 and that the packet type bit is a one to indicate that the management byte sent from the peripheral card 38 is in reply to a request from the controller card 36.

Figure 14:
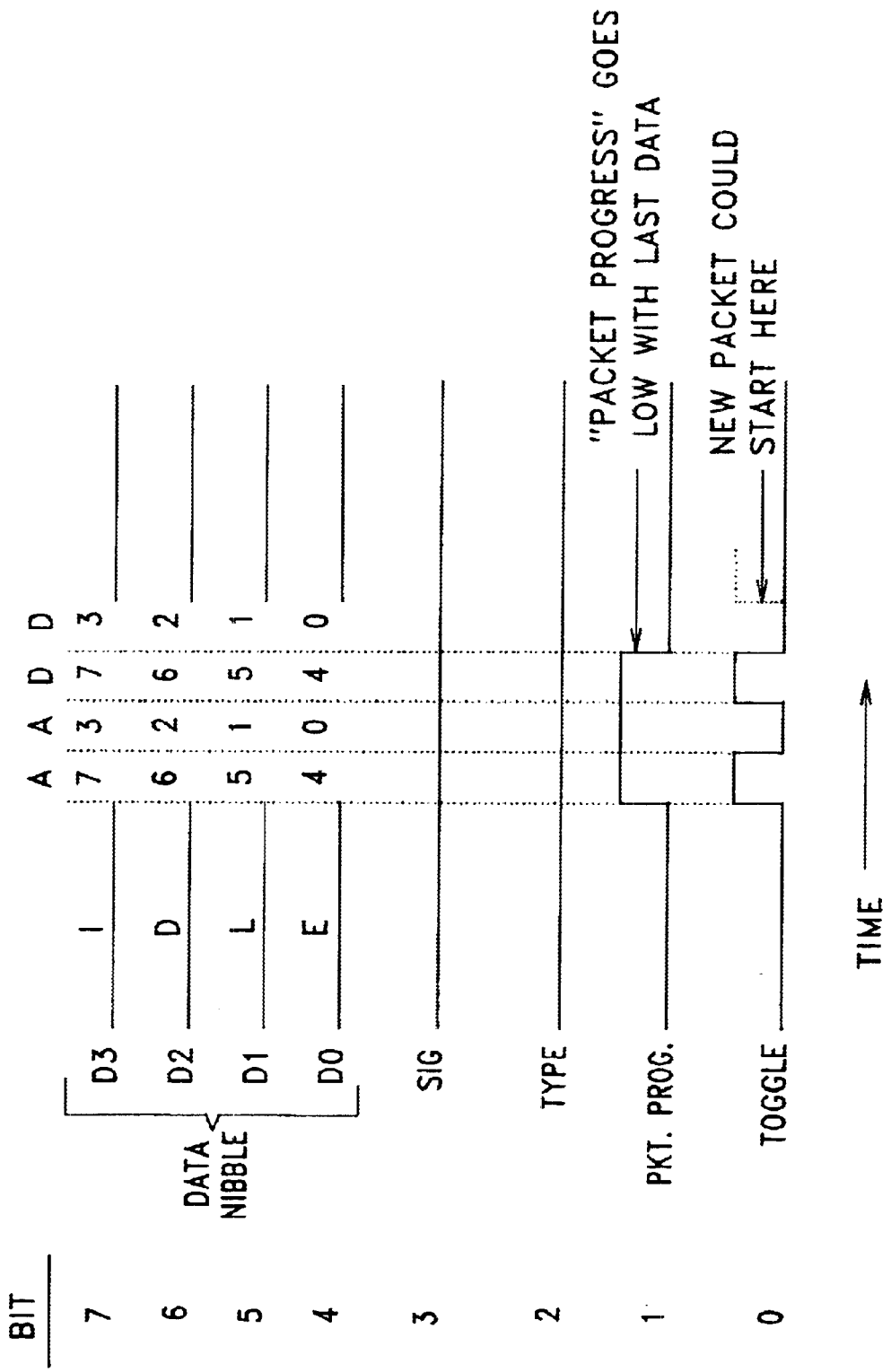
FIG. 14 is a timing diagram showing a sequence of management bytes of control data sent on one of the PCM highways of FIG. 4.

The flow control scheme can be better appreciated by reference to FIG. 14. FIG. 14 is an example of a write command from the controller card 36 to a particular peripheral card. It shows the condition of each of the eight bits for sequential management bytes. Of course the bytes are spaced apart from each other in time, which is not necessarily reflected in the figure. Each bit is shown as a separate horizontal line on the chart, with time running from left to right. The left-most vertical column in the chart indicates the type of bit for each row. The first part of the actual chart in FIG. 14 shows an idle condition in which all bits are in the low state. The next four consecutive bytes to a particular card are shown. The first byte features the packet progress bit going high to indicate that a packet transmission is now in progress. The toggle bit goes from low to high to indicate that new data is available in the data nibble. The packet type is low, indicating that the packet type is a command in the case of a management byte from the controller card 36, or a volunteer in the case of a management byte from the voice card 38. The signaling byte is low to indicate that the entire byte is a management byte. The four most significant bits are the four bits of the data nibble. The first byte contains the upper nibble of an address byte, as indicated by the "A" at the top of the column. The next byte is similar to the first byte, with the differences being that the toggle bit goes from high to low to indicate that new data is available in the data nibble. In addition, the four bits in the data nibble now represent the lower nibble of the address byte. The third byte shown in FIG. 14 again shows the toggle bit going from a low condition to a high condition to indicate that new data is available in the data nibble. In this case, the four bits in the data nibble are the upper nibble of a data byte that is being transmitted in this management byte. The next byte shown shows that the packet in progress bit has gone low indicating that the packet is done yet the data in the data nibble is still valid and is to be captured. As indicated by the phantom toggle bit on the next clock pulse, the new packet could start as soon as on the next clock pulse if the packet in progress bit were to go high and the toggle bit were to toggle as shown.

Of course, while it is not shown in this example, there could be several sequential identical bytes sent without the toggle bit changing state. For example, the toggle bit could be high for 3 time units, be low for 1 time unit, be high for 14 time units, and so forth. In such situations, all the repeated bytes would be ignored as the data is only valid when the toggle bit changes state. The idle command is indicated when all eight bits in a management byte are zero.

As can be seen, the packets conform to a memory-mapped philosophy. An eight-bit address and eight-bit data are sufficient for current needs, although they could be scaled upward as necessary. To optimize the transmission, the minimum number of bytes necessary are exchanged. This means that write operations will contain an address and data, while read operations include an address only (in the request) and data only (in the response). This minimizes the amount of memory storage necessary to implement the protocol. The first byte will have the packet in progress bit set, while the last byte has the packet in progress bit at zero. Nevertheless, this final data nibble is valid and is to be captured.

A particular packet may be reserved for future expansion. For example, an address of $FF_{16}$ may mean that a 16-bit command will follow. In addition, the bits in the tables have been defined such that the "wait/idle" code is $00_{16}$. This is designed to be convenient for the hardware on the receiving end, so that all flip-flops can be cleared with a global reset at power up.

As can be seen, it would also be possible to modify the signaling bytes to contain up to six bits of information with a single bit to indicate that it is a signaling byte and another bit to indicate multi-frame alignment. In this case, the card 38 could use the multi-frame alignment bit to count forward and know which channel on the card is being addressed, so that the three-bit channel information would not need to be sent across the backplane 34. The advantage of the approach implemented, however, is that all the necessary information is self-contained in the signaling byte with the limitation that only eight channels can be addressed.

The signaling byte for each of the eight channels on an FXO card, for example, occurs every 24 sync pulses, which is the same rate as in Extended SuperFrame (ESF) format for T-1 data, or approximately every 3 milliseconds. The eight signaling bytes are followed by a management byte and then by spare bytes until the $24^{th}$ sync pulse.

Figure 15:
FIG. 15 is a memory map in an FPGA on the controller card of FIG. 4, showing the signaling and management data to be transmitted to the peripheral cards.
Figure 16:
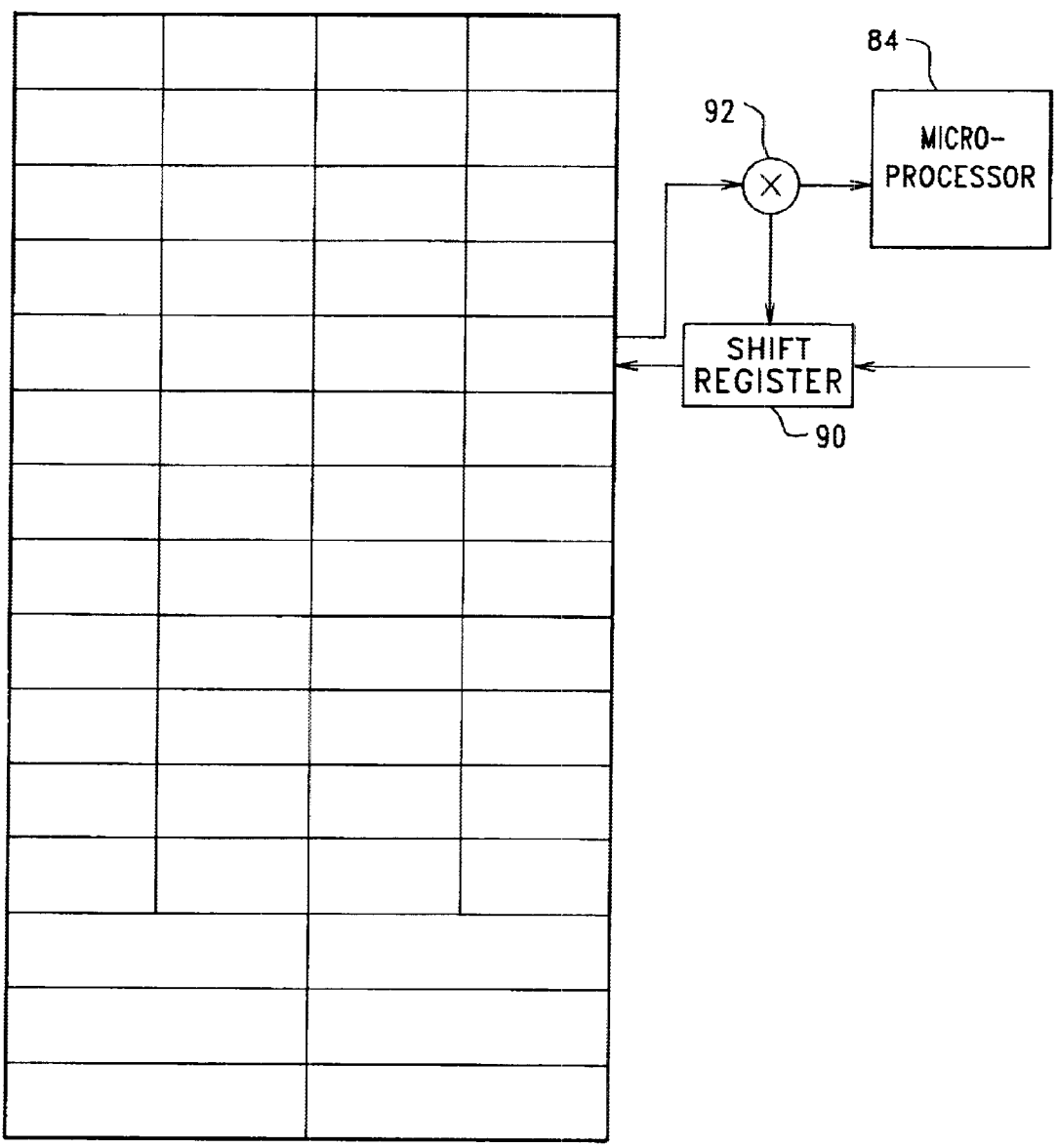
FIG. 16 is a memory map in an FPGA on the controller card of FIG. 4, showing the signaling and management data received from the peripheral cards and the interrupt scheme associated therewith.

The state machines that reside in the FPGA on the controller card 36 are shown in FIGS. 15 and 16. FIG. 15 represents the memory map 86 or state machine for the transmission of data from the controller card 36 to the voice cards. The state machine is actually dual-ported RAM that has been divided up into locations that correspond with the data nibbles sent to each of the cards. As can be seen, a section of the RAM is devoted to card slot 1, with this section sub-divided into four-bit sections for each of the eight channels on card one. Each four-bit subsection includes a bit for each of the A, B, C, and D signaling bits. As can be seen, there are similar sections for card slots 2 through 6. There is also a management section with eight bits devoted to each of the six cards. All of these memory locations can be written to by the microprocessor 84 and read from to create the signaling and management bytes to be transmitted to the voice cards, as described above.

A similar memory map 88 or state machine for the receive direction is shown in FIG. 16. The receive state machine is nearly identical to the transmit state machine. One difference is that, since C and D signaling bits are not received back from the voice cards, the bit locations in the receive state machine represent the different signaling bits sent back from the voice card. In addition, so that the microprocessor 84 need not continuously monitor the contents of the receive memory map from the voice cards, logic shown in FIG. 16 is provided to interrupt the microprocessor 84 whenever there is a change in the state of any information received from the voice cards. As can be seen, the data comes in from the cards and is input into a shift register 90. The data from the shift register 90 is provided to a set of gates 92 that provide an exclusive OR gate operation. The exclusive OR operation compares the data just received from the cards with the corresponding data in the memory map 88. If the data is different, then the exclusive OR operation produces a signal that can be used to send an interrupt to the microprocessor 84, indicating that the data from the cards has changed. Of course, the receive data in the shift register is also put into the appropriate location in the memory map 88 to write over the prior data in the memory map for that card.

The voice card protocol described above is also used in a modified form for interfacing to V.35 cards. The information between the controller card 36 and the V.35 cards can also include real time data as well as non-real time data such as status, configuration, and so forth. The real time data is sent in a low nibble and a high nibble for each of the V.35 circuits on each V.35 card. Thus, only four bytes are necessary to send this data. The other four bytes that would correspond to the four channels in the voice card are currently unassigned. When the management bit is low, then status and configuration data is send in the four most significant bits of the byte. This format is similar for both the transmission to the V.35 card as well as the receive information from the V.35 card.

Slot Management Algorithm

An algorithm for managing, controlling, and communicating with the cards in the six card slots resides in the microprocessor 84 on the controller card 36. In the current implementation, this microprocessor is a Motorola Power PC 850 SAR, although any other suitable processor could be used as well.

Figure 17:
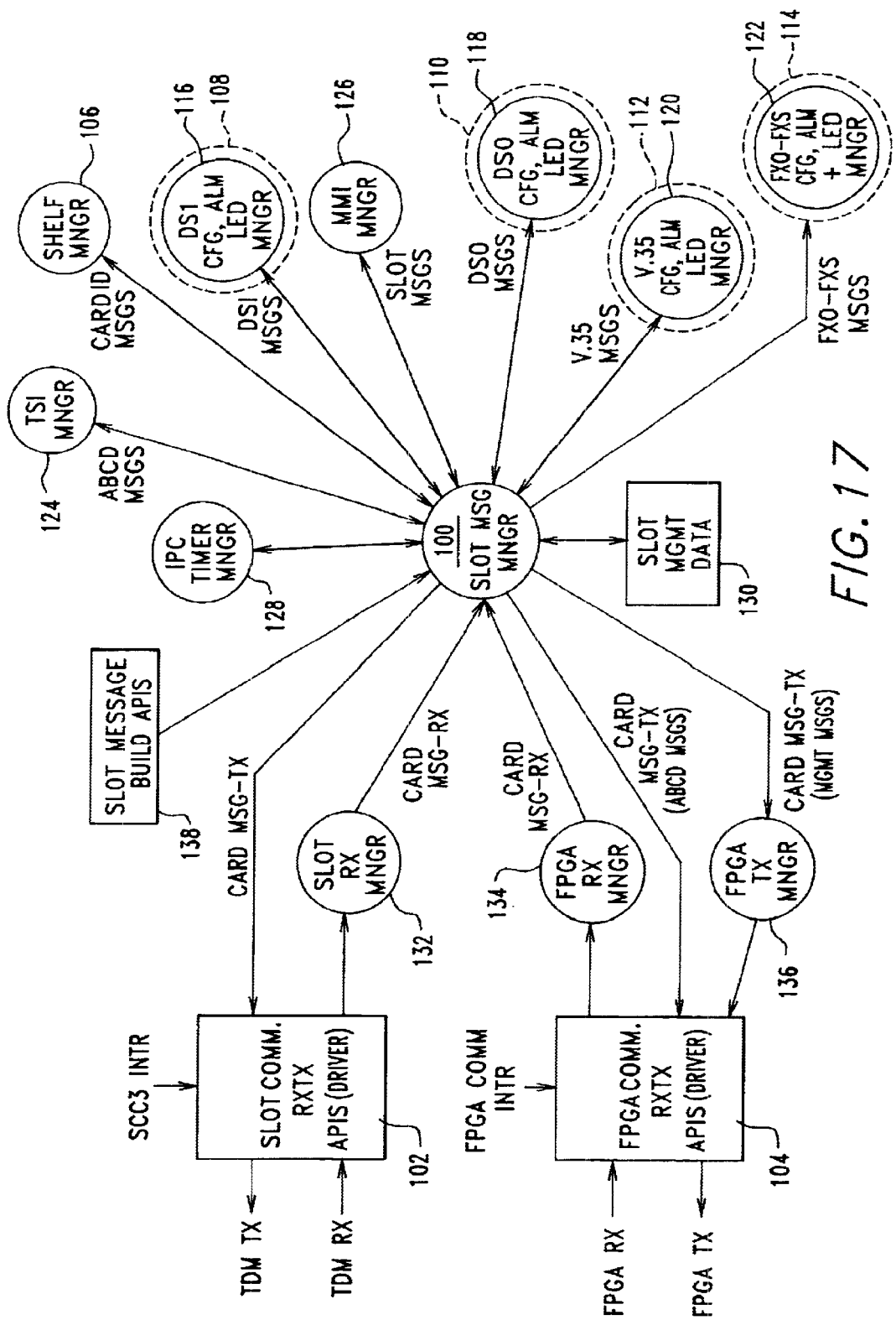
FIG. 17 is a functional block diagram of the software architecture within the microprocessor of the telecommunication device of FIG. 1, showing the slot management scheme.

The basic structure of software algorithms within the microprocessor 84 provides for a number of managers that manage a particular type of processing. For slot management, the manager is a Slot Message Manager 100, as shown in FIG. 17. All communications to and from the card slots are routed through the Slot Message Manager 100. The Slot Message Manager 100 can communicate with the card slots through either a slot communication receive/transmit API driver 102 or an FPGA communication receive/transmit API driver 104, as may be appropriate. The FPGA communication receive/transmit API driver 104 is used for communication with FXO and FXS cards, for example.

In particular, the Slot Message Manager 100 utilizes six different managers, one dedicated to each of the card slots. Each of the specific card slot managers are only employed when and if a card is actually inserted into a given card slot. In other words, until a card has been inserted into a given slot, the manager is not established within the microprocessor 84. First, the Slot Message Manager 100 determines that a card has been inserted into a given slot and the type of communication protocol to communicate with the card in the given slot is determined. The Slot Message Manager 100 also queries the card to understand the type of card that has been placed into that slot.

Then the Slot Message Manager 100 can establish a manager corresponding to that type of card in the given card slot. As can be seen, if six identical cards are inserted into the telecommunication device 30, then the Slot Message Manager 100 will establish six different card managers (actually six different address pointers will be established in the same block of code). The types of cards for which the Slot Message Manager 100 can establish a card manager, as currently implement, include an HDSL-2 card, a quad T-1 card, an FXO card, an FXS card, a V.35 card, and an ISDN card. This scheme is easily expandable so that other types of cards can also be accommodated. This type of distributed management allows the algorithm to handle multiple tasks and messages, since each manager is handling its own tasks and messages. By eliminating the particular card slot manager when a card is removed from a slot, there are not resources unnecessarily devoted to missing cards. In addition, since it is possible to have many more types of cards than there are cards actually inserted into the telecommunication device 30, there is no need to keep operating the processes for each of the managers for these various type of possible cards. It is more efficient to only operate those processes when a card of that actual type is inserted into a given card slot.

The communications from the slot communication receive/transmit API driver 102 to the cards goes through the serial communication channel number three (SCC3) of the microprocessor 84. The communication through the SCC3 port is an 8.192 Mbps PCM highway.

Although a card manager disappears when a card is removed from a given slot, the data associated in an associated data base with that particular card slot does not disappear, so that if an identical card is inserted into that same card slot, the retained data can be used by that identical card.

There is at least one exception to the rule that a particular card manager does not exist if there is not a card in the given card slot. This is in the case where it is desired to configure and provision a card for a customer prior to the card being available. For example, if the telecommunication device 30 is being installed at a customer installation and a V.35 card is not yet available, it is still possible for the card to be configured and provisioned. This is done by the processor 84 by logically inserting the card, even though it is not actually physically inserted. The Slot Message Manager 100 will go ahead and create a card manager for the given card slot and the card manager will receive external commands for configuring and provisioning the card. As the card manager attempts to send messages to the actual card, these messages go through the Slot Message Manager 100. The Slot Message Manager 100 understands that the card is not actually physically present by checking the card present bit described previously. Because the card present bit is not set, the Slot Message Manager 100 does not actually attempt to send messages to the card. Nevertheless, in this way, the card can be programmed and provisioned logically prior to actual insertion of the card, by providing this information to the applicable card manager.

A Shelf Manager 106 in communication with the Slot Message Manager 100 is responsible for monitoring the presence of cards in each of the slots. Because of the substantial processing and setup that occurs when a card is first inserted, it is desirable to reduce the amount of unneeded processing for situations where a card is inserted and then immediately pulled back out because it was inserted in the wrong slot. Accordingly, the Shelf Manager 106 in effect performs a de-bouncing function by waiting until a card has been inserted for greater than 2.5 seconds before beginning to set up a card manager and other associated processing. There is no similar de-bouncing function that occurs when a card is removed. Instead, when a card is removed, then the processing associated with eliminating the card manager begins immediately. The Shelf Manager 106 also monitors a heartbeat message and synchronizes the blinking rate for the LEDs on the various cards. Periodically heartbeat messages are sent to each peripheral card to ensure that the card is able to communicate and is active. Otherwise, it is possible that no messages might be sent to a card for a long period of time and the controller card 36 would not be able to know whether the card was active.

For simplicity, only the card managers for four different card slots are shown in FIG. 17. In this figure, the dashed line 108 shows the slot in which a card manager for card slot 1 would be placed. The dashed line 110 shows the location where the card manager for card slot 2 would be placed. The dashed line 112 shows the location where the card manager for card slot 3 would be placed. The dashed line 114 shows the location where the card manager for card slot 4 would be placed. In this case, a DS-1 card manager 116 is shown in location 108 (corresponding to card slot 1), a DS-0 card manager 118 is shown in location 110 (corresponding to card slot 2), a V.35 card manager 120 is shown in location 112 (corresponding to card slot 3), and an FXO/FXS card manager 122 is shown in location 114 (corresponding to card slot 4).

Since the processing is similar for each of the different types of card managers, it will be described generally. First, when a card is inserted and a card manager is established, the card manager reads the hardware switches, if any, that may be set on the card. The card manager also reads the hardware revision number from the card and the common language equipment identifier (CLEI) code, as well as any other similar information. Next, the card manager provisions the card by pulling data from a database that stores data associated with each type of card. As described previously, it is possible to pre-provision the card in a logical sense prior to the card being inserted, so that an operator can make specific provisions to that card when it is eventually inserted. Such data would be stored in the database (not shown). Next, based on the type of card in the particular card slot, the card manager makes a request to a time slot interchange (TSI) manager 124 for a time slot assignment for that card. Because different types of cards require a different amount of bandwidth on the PCM highways, the number of time slots assigned to a particular card is a function of the type of card. In other words, an FXO or FXS card having eight voice channels only needs eight DS-0 channel slots on a PCM highway. On the other hand, a quad T-1 card carrying four T-1 channels of traffic requires 4×24, or 96, DS-0 channels. It can be seen that the quad T-1 card will need to be assigned a proportionately larger number of time slots by the TSI manager 124. Once the card manager receives a time slot assignment from the TSI manager 124, the card manager provisions its card with regard to this information by communicating to the card its assigned time slot for PCM data.

Next, the card manager processes the alarms, if any, from the card. This is done by looking for alarms and taking appropriate action. For example, if a quad T-1 card detects a loss of signal, perhaps due to someone disconnecting a T-1 line from the telecommunication device 30, the loss of signal alarm will be sent by the affected quad T-1 card asynchronously to the Slot Message Manager 100 which then passes the alarm to the relevant card manager. The card manager logs the event and notifies whichever other managers need to be notified of an alarm. For example, the loss of signal alarm may cause the card manager to communicate with the TSI manager 124.

The card manager also manages the function of any visual indicators (LEDs) on its respective card. Such LEDs may indicate alarm conditions such as loss of signal, and so forth.

In addition, the card manager may change the configuration to its respective card at a subsequent time if commanded externally. For example, if a user commands that the card in card slot 1 change its data format from SuperFrame (SF) to Extended SuperFrame (ESF), then the command may come through a command line interface (CLI) to a man machine interface (MMI) manager 126. The command will then come to the card manager 116 in the slot corresponding to card slot 1. The card manager 116 will then communicate this new configuration to the card through the Slot Message Manager 100.

Each of the card managers 116, 118, 120, and 122, described above differ from each other primarily in that they are each equipped to communicate with the particular type of card they correspond with. In other words, a particular card may have a particular message set that it expects to communicate with, and the card manager will be equipped to do so.

The MMI manager 126 communicates not only with the Slot Message Manager 100 as is shown in FIG. 17, but with nearly all of the other managers as well. The MMI manager 126 may communicate directly with the Slot Message Manager 100 in situations such as debug sessions, clearing hang-ups, or in performing a reset function. In these cases, the MMI Manager 126 may send commands directly to a card through the Slot Message Manager 100. For example, two commands that can be sent by the MMI Manager 100 to any of the cards are the command for the card to reply what type of card it is and the command for the card to reset itself. It is a requirement that all cards be able to respond to these two commands from the MMI Manager 126, regardless of the type of card.

The TSI Manager 124 includes a cross-connect table for the TSI operation performed in the FPGA. This information is communicated to the FPGA through the Slot Message Manager 100. The cross-connect information for the TSI Manager 124 may come from any external interface to the microprocessor 84.

The TSI Manager 124 also manages the trunk processing, such as informing one phone connection that the other phone connection has been disconnected, such as if a card is removed or a cable is unplugged. In addition, the A, B, C, and D signaling bits are managed by the TSI Manager 124, to inform the cards, and eventually the end user, that a particular line has gone off-hook, and so forth. For example, when a particular voice channel on an FXS card detects that a phone has gone off-hook or on-hook, this information needs to be passed to the phone at the other end of the telephone network. Of course, the voice channel on the particular card does not know which other channel it is connected to. Only the TSI Manager 124 knows this, so the ABCD signaling bit information is provided to the TSI Manager 124 for appropriate handling of this information. In other words, the TSI Manager 124 manages the ABCD bitstream in both directions.

An IPC Timer Manager 128 manages timers of any given length for the Slot Message Manager 100. For example, if a request goes out to a card, an appropriate timer is set for receiving a response to the request. If a response is not received to the request within the timer period, the timer will time out, and the card manager responsible for that card will take the appropriate action. As currently implemented, there are 256 different-length timers per card. Default values are provided for situations where no specific time period is specified.

A Slot Management Database 130 stores data for use by the Slot Message Manager 100. The Database 130 is essentially a state machine with data relating to the various slots, requests and so forth. For example, certain cards may only be able to handle one message at a time. The telecommunication device 30 may have five to ten users at once when the system is being provisioned. In that case, there may be several messages that various users want to send to a particular card. The Slot Message Manager 100 will queue up a list of messages to be provided to that card. Such queued messages will be stored in the Slot Management Database 130.

A Slot Receive Manager 132 receives messages from the Slot Communication Receive/Transmit API Driver 102 and provides received card messages to the Slot Message Manager 100. The Slot Receive Manager 132 serves as the communication between the controller card 36 and other cards that utilize a communications protocol different from the Voice Card Protocol described earlier. In this case, a time division multiplex signal is sent between the microprocessor and the tributary card.

An FPGA Receive Manager 134 receives data from the FPGA Communication Receive/Transmit API Driver 104. The FPGA Receive Manager 134 de-packets data by waiting until the received message is completed, since the data can be sent in packets. In addition, the FPGA Receive Manager 134 serves as a filter to filter out garbage and noise.

An FPGA Transmit Manager 136 receives management messages for the cards from the Slot Message Manager 100 and provides them to the FPGA Communication Receive/Transmit API Driver 104. The FPGA Transmit Manager 136 serves to space out the commands by three milliseconds.

Both the Slot Communication Receive/Transmit API Driver 102 and the FPGA Communication Receive/Transmit API Driver 104 are device drivers. Interrupts come into the system through these API Drivers 102 and 104.

A Slot Message API 138 is essentially a database or table. Every card will have a set of card messages that it is compatible with. The Slot Message API 138 uses a table-driven message to create these messages. For example, it may be necessary to add some bytes to meet the protocol for that particular card. Thus, on outbound messages to the cards, there is an Add Protocol function that is performed and on inbound messages from the cards, there is a Remove Protocol function that is performed. These two protocols add and remove headers, check sums, and so forth.

The Slot Message Manager 100 is set up so that all messages to the cards have to go through the Slot Message Manager 100. The Slot Message Manager 100 knows the slots and the contents of each slot as well as whether or not a message has already been sent to a card in that particular slot.

As can be seen, the slot message management algorithm described above allows for an efficient use of processor resources, while at the same time allowing any of a variety of types of cards to be plugged into of a plurality of slots in the telecommunication device 30. The algorithm allows for configuration, control, and management of the cards in the various slots without an-overly complex architecture, or needless use of processor resources. Because of the architecture described herein, both the MMI Manager 126 and the TSI Manager 124 can just think of channels and slots, and does not have to be aware of the particular type of card in a given slot, or its configuration. In addition, only those card managers for cards that are actually inserted into the card are functional at any given time. Clearly, such algorithm and software architecture provides for a great deal of flexibility, yet does so in an efficient manner.

Tributary Addressing Scheme

At times it is desirable for external users of the telecommunication device 30 to be able to address commands to particular tributaries in communication slots on the cards in the telecommunication device 30. A tributary is any telephone signal, be it voice or data, that is typically multiplexed with other tributaries to achieve a higher rate signal. From the viewpoint of an external user of the telecommunication device 30, it is desirable for the command and addressing scheme for a particular slot to be as simple as possible. From the viewpoint of the processing internal to the telecommunication device 30, it is necessary for the addressing scheme to be more detailed and specific than the external addressing scheme. For these reasons, the following tributary addressing scheme has been developed.

The table of FIG. 18 shows the internal addressing format. As can be seen, each address is a series of entries, with each entry including two bytes. The first entry, or base entry, exists for every address. The base entry includes as its first byte, the number if tributary entries in the address. Essentially, this byte provides information about the length of that particular address. When an address consists only of the base entry, the number of entries byte will equal zero. The second byte in the base entry is the slot number, with a one corresponding to slot 1, and so forth.

After the base entry, there will be a number of tributary entries that are equal to the number of entries byte in the base entry. Each tributary entry includes two bytes, with the first byte representing the type of tributary being described in that tributary entry. A simple code is used to refer to the various types of tributaries. For example, an OC3 tributary may have a code of one, an OC1 tributary may have a code of two, an STS1 tributary may have a code of three, a VT1.5 tributary may have a code of four, aDS-1 tributary may have a code of five, and a DS-0 tributary may have a code of six. Of course, additional types of tributaries can be included in this addressing scheme by simply applying a code number to any additional types of tributaries. The second byte in the tributary address is the number of the particular tributary being addressed in this tributary entry. Tributary numbers are zero-based, so that a byte with a value of one refers to the second tributary.

If more than one tributary entry is provided, then the higher bandwidth channel is provided first with the particular tributary specified, and then the subsequent tributary entry will refer to a lower bandwidth channel within the higher bandwidth channel. For example, the first tributary entry may refer to a particular DS-1 stream, and the second tributary entry may refer to a particular DS-0 channel within that DS-1 stream. Of course, because of the ability to specify the number of tributary entries at the beginning of the address, it is possible for an address to be extremely long, thus accommodating very complex addresses.

The example of FIG. 19 shows the internal address that corresponds to a particular physical address. The internal address is shown in hexadecimal format with bytes separated by commas. The first entry in the example shows that to address slot 1, the internal address would first consist of a byte having a value of zero because there are no tributary addresses. The second byte in the internal address is 01 to indicate that slot 1 is being addressed.

The second example shown is the internal address for the first OC3 channel in slot 1. The internal address is 01 for the number of tributary entries because one tributary type and number will be given. The second byte in the base entry is 01 because slot 1 is being addressed. The first tributary entry has a first byte of 01 corresponding to an OC3 type of tributary and the second byte in the tributary entry is 00, corresponding to the first OC3 channel.

The third example is an internal address for the first OC1 channel and slot 1. Again, this internal address has a base entry of 01, 01 corresponding to one tributary entry and slot 1 being addressed. The first byte of the tributary entry is 02, corresponding to an OC1 type of channel. The second byte in the tributary entry is 00, corresponding to the first OC1 channel.

The fourth example is an internal address for the second STS1 channel and slot 2. This address has a base entry 01,02, corresponding to one tributary entry and slot 2 in the telecommunication device 30. The tributary entry is 03,01, corresponding to the second STS1 channel.

The fifth example in FIG. 19 is an internal address for the 12th VT1.5 channel and slot 1. The base entry has a value of 01,01 corresponding to one tributary entry and slot 1 of the device 30. The first byte of the tributary entry is a 04 corresponding to a VT1.5 type of channel. The second byte is a $0B_{16}$ which, when converted to decimal format, corresponds to the 12th channel of that type. In other words, this refers to the 12th VT1.5 channel.

The sixth example of FIG. 19 refers to the 20th VT1.5 channel in the second STS1 channel in slot 1. The base entry for this internal address is a 02,01 corresponding to two tributary addresses, and slot 1 being the slot addressed. The first tributary address includes a value of 03,01, corresponding to an STS1 type of channel, and the second channel of that type. The second tributary entry has a value of $04,13_{16}$, corresponding to a channel type of VT1.5, and the 20th channel of that type.

The sixth example relates to the first VT1.5 channel in slot 2. The base entry for this address has a value of 01,02, corresponding to one tributary entry, and slot 2 being the one addressed. The tributary entry has a value of 04,00, corresponding to a VT1.5 type of channel, and the first channel of that type.

The seventh example refers to the 18th DS-1 channel in slot 3. The base entry of the internal address has a value of 01,03, corresponding to one tributary entry and slot 3 being the one addressed. The tributary entry has a value of $05,11_{16}$, corresponding to a DS-1 type of channel, and the $18^{th}$ channel of that type being the one addressed.

The ninth example provides an internal address for the $24^{th}$ DS-0 channel in the $18^{th}$ DS-1 channel of slot 3. The base address has a value of 02,03, corresponding to two tributary entries and slot 3 being the one addressed. The first tributary entry has a value of $05,11_{16}$, corresponding to a tributary type of DS-1, and the $18^{th}$ channel of this type being the one addressed. The second tributary entry has a value of 06,17, corresponding to a tributary type of DS-0, and the $24^{th}$ tributary of that type being the one addressed.

The tenth example provides the internal address for the $24^{th}$ DS0 channel in the second DS1 channel of slot 0. The internal address has a base entry of 02,00, corresponding to two tributary entries and slot 0 being the one addressed. The first tributary entry has a value of 05,01, corresponding to a DS-1 type of tributary and the second tributary of that type being the one addressed. The second tributary entry has a value of $06,17_{16}$, corresponding to a tributary type of DS-0 and that $24^{th}$ tributary of that type being the one addressed.

The internal addresses are used by the MMI manager 126, the Slot Message Manager 100 and other components internal to the telecommunication device 30. The external commands provided by a user are converted to the internal commands by a parser and lexer as described in more detail below.

The external commands can use a single command set that are converted by the processor 84 to commands consistent with the type of card installed in the telecommunication device 30. In addition, the external command and address need not refer to the specific type of card installed in a given card slot. Instead, the external address refers merely to a slot number and a channel number on the card in that slot. The further detail of the type of card and tributaries is provided in the internal address as part of the conversion from the simpler external address to the internal address.

First, a lexical scan is performed that involves doing a database call to resolve the external address into a tributary type. This may first involve looking in the referenced slot to determine if a card is present and the type of card present in that slot. The lexical scan passes the tributary type and other address information back to the parser in the form of tokens. The lexical scanner is a GNU FLEX tool. The parser compares the combination of tokens it receives from the lexical scan to a table it has of various combinations and permutations of tokens. From this, the parser can develop an address and specific command for the relevant card. The parser is a GNU BISON tool. Once the parser finds an entry in its table that corresponds to the combination and permutation of tokens received from the lexical scan, then an internal command and address is generated thereby.

Battery Sense Circuit

One embodiment of the present invention is adapted to monitor various characteristics of a backup battery optionally used in the output of the power supply of the telecommunications system. In normal operation, a main converter provides regulated DC power to the system and the backup battery is not utilized. If the main converter fails, then energy from the battery is used to provide backup power to the telecommunications system.

In order to improve the robustness of the telecommunications system, it is desirable to monitor the status of the backup battery. It is desirable to have the backup battery directly across the output of the main converter to allow instantaneous backup of the power as well as to minimize power loss in the battery discharge path. However, with such a configuration, it becomes more difficult to determine the presence of a battery or to determine the battery current. Embodiments of the present invention are directed at overcoming these problems.

Accordingly, in one example of the present invention, a circuit is provided for sensing 1) whether or not a battery is present in the system, 2) whether the battery is charging or discharging, and 3) whether the battery is in a low voltage condition. Visual indication and feedback to the controller card 36 are provided so that the status of the battery can be easily monitored in either of these states. The present invention monitors the status of the battery both when the main converter is properly operating (i.e., when the battery is not the main power source for the system), and when the battery is providing power to the telecommunications system (i.e., when the main converter has failed).

In contrast with conventional battery sensing circuits, a variable resistive element, placed in series with the battery, is used to monitor the current flow through the battery. In this manner, the effect of the monitoring circuit on the battery is reduced, and battery life is extended when compared with some conventional battery monitoring circuits. The variable resistive element is also used to effectively disconnect the battery in the low battery condition by going to a high resistance condition, eliminating the need for a disconnect relay or switch.

Figure 20:
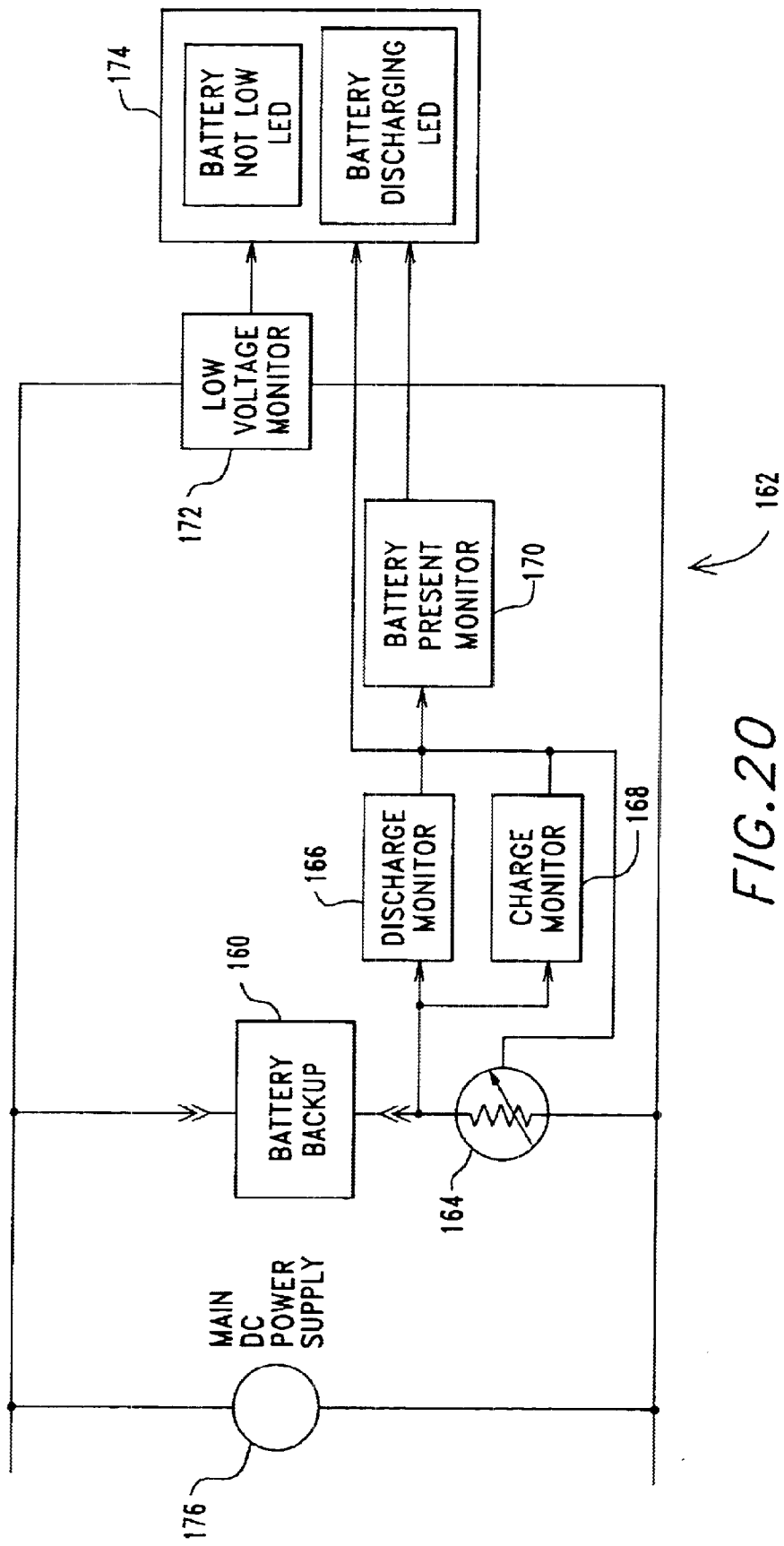
FIG. 20 is a functional block diagram of a battery sense circuit of the present invention.

FIG. 20 shows a block diagram of one embodiment of the present invention for monitoring various characteristics of a battery 160 used in a telecommunications device in accordance with the present invention. The battery monitoring system 162 includes a variable resistive element 164, a discharge monitor 166, a charge monitor 168, a battery present monitor 170, a low voltage monitor 172, and a plurality of LEDs and optocouplers 174.

The battery 160, shown as a backup battery, is optionally installed in parallel with the main DC power supply 176 so that if the main power supply 176 fails, the battery 160 provides backup power to the telecommunications system. In accordance with the present invention, the variable resistive element 164 is placed in series with the battery 160. The discharge monitor 166 and the charge monitor 168 measure the current through the variable resistive element 164 to determine whether the battery 160 is being charged or discharged. The battery present monitor 170 determines whether a battery 160 is present, and if so, provides power to the bank of LEDs 174. If the battery 160 is discharging, the discharge monitor 166 illuminates the "battery discharging" LED. Further, a low voltage monitor 172 is provided in parallel with the battery 160 and illuminates the "battery not low" LED when the battery voltage is of sufficiently high level.

Figure 21:
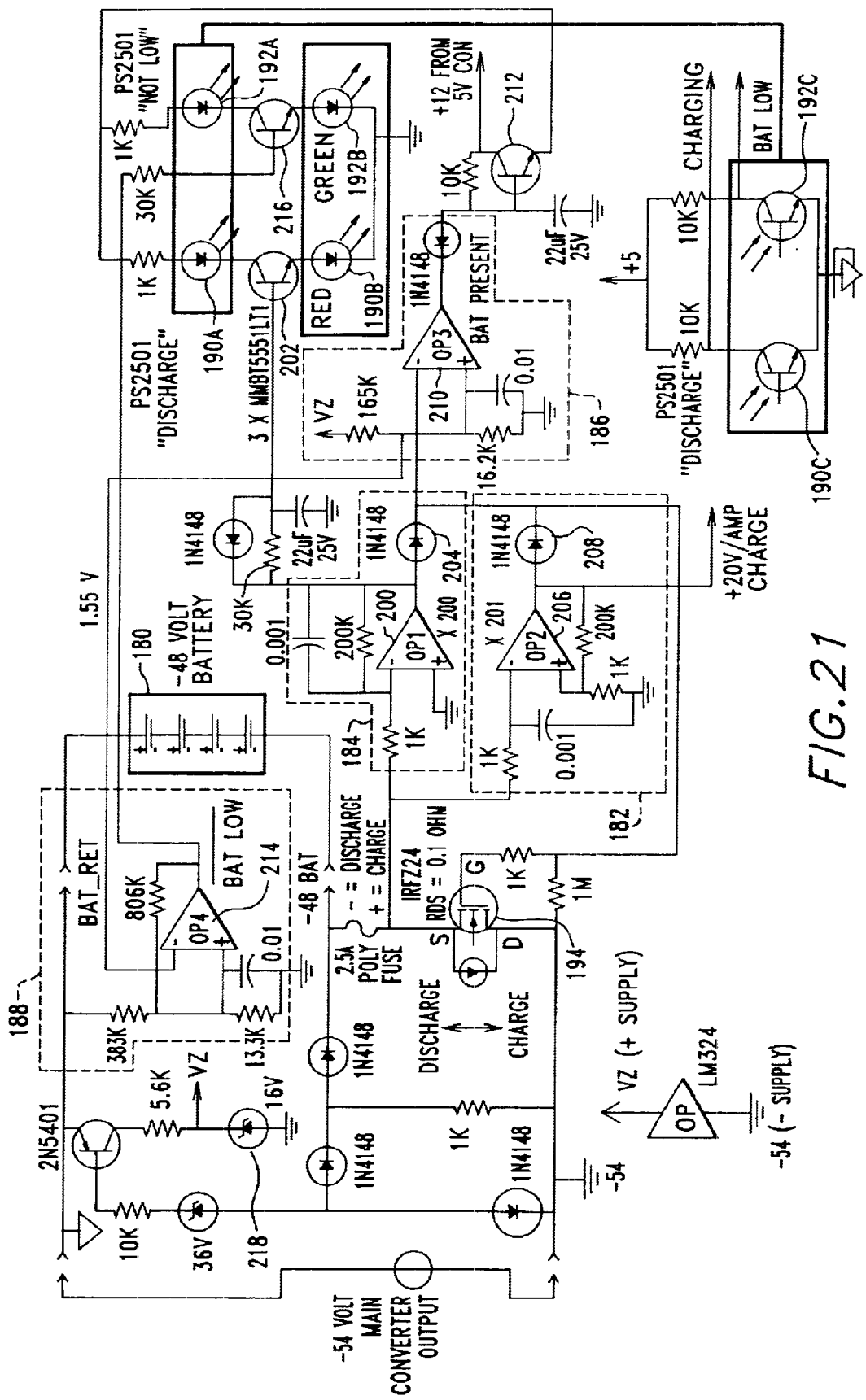
FIG. 21 is a schematic diagram of the battery sense circuit of FIG. 20.

FIG. 21 shows one example of a circuit for monitoring various characteristics of a battery used in a telecommunications device in accordance with the present invention. The battery 180, in this example being a −48 volt battery, is coupled to various monitoring circuits in accordance with the present invention. A battery charging monitor circuit 182, a battery discharging monitor circuit 184, a battery present monitor circuit 186, and a low voltage monitor circuit 188 are shown in FIG. 21 which monitor the status of the battery and variously control LEDs 190A/B and 192A/B, the "A" LEDs being the LEDs of optional optocouplers whose output elements are shown by 190A and 192A and the "B" LEDs being visual indicators, thereby providing visual indications regarding the status of the battery. Optionally, the receive elements 190C and 192C of the optocouplers may be located at a remote location from the circuit 162, such as on the controller card 36.

A variable resistive element 194, such as a Field Effect Transistor (FET), is coupled to the battery 180 so that the current through the battery 180 can be sensed by the charging and discharging monitors 182, 184. In one example, the FET 194 is a power FET, model IRFZ24 available from International Rectifier, having an "on" resistance of 0.1 ohms. The source S of the FET 194 is coupled to the battery 180, the drain D is coupled to the voltage reference (i.e., −54 volts), and the gate G is coupled to the outputs of the battery charging and discharge monitor circuits 182, 184. When a positive voltage from the gate to source ($V_{GS}$) is applied to the FET, the FET conducts current from its source to the drain (or in the reverse direction) with a variable resistance which is a function of the magnitude of $V_{GS}$.

Sensing the presence of the battery and the magnitude of the battery current is not difficult when the level of the current is close to the circuit maximum design rating. In this instance, a simple resistive element could be used to develop a voltage of sufficient magnitude to allow sensing of the current without a significant voltage drop and corresponding power loss. The difficulty arises when the magnitude of the battery current becomes very small with respect to the full load current, as would be the case when the battery is charging with a trickle level of charge. In this case, the current could be as low as 1/1000 of the full load current or less. Using the same simple resistive element as in the full load current case would result in a very small generated voltage, which would be difficult to impossible to measure with any practical sensing circuit.

In accordance with the present invention, the use of a variable resistance element 194, such as a FET, allows modulation of the resistance 194 in series with the battery 180 such that when the battery charging or discharging current becomes very small, the resistance of the FET can be increased to allow a measurable level of voltage to determine the direction and presence of battery current flow.

In particular, the battery discharging monitor circuit 184 includes op amp circuit 200 which detects when the battery is discharging. Op amp circuit 200 monitors the voltage developed across the variable resistive element 194 to determine whether the battery 180 is discharging. The output of op amp circuit 200 controls a transistor 202 which controls LEDs 190A and 190B, which when illuminated indicate that the battery 180 is discharging. In one example, the op amp circuit 200 is configured as an integrating inverter with a gain of 200. A diode 204 is coupled to the output which acts as a peak detector. The output of the diode 204 is also coupled to the gate of the FET 194 to allow control of the variable resistance, and to the input of the battery present monitor circuit 186 described below.

The battery charging monitor circuit 182 includes op amp circuit 206 which detects when the battery 180 is charging. Op amp circuit 206 monitors the voltage developed across the variable resistive element 194 to determine whether the battery 180 is charging. In one example, the op amp circuit 206 is configured as a non-inverting stage with a gain of 201. A diode 208 is coupled to the output which acts as a peak detector. The output of the diode 208 is also coupled to the gate of the FET 194 to allow control of the variable resistance, and to the input of the battery present monitor circuit 186 described below.

The battery present monitor circuit 186 includes op amp circuit 210 which detects when a battery 180 is present. Op amp circuit 210 has its noninverting input coupled to the outputs of both circuits 182 and 184 through the peak detector such that the most positive signal is sensed. When either output of circuits 182 or 184 is active, op amp circuit 210 turns on and generates a "battery present" signal which is coupled to control transistor 212 thereby in part controlling current flow into LEDs 190A, 190B, 192A, and 192B.

The low voltage monitor circuit 188 includes an op amp circuit 214 which is configured as a comparator and detects when the battery voltage is below a predetermined voltage. In one example, op amp circuit 214 generates a "battery low" (active low) signal at its output, which controls transistor 216. The setpoint at which the op amp circuit 214 generates a "battery low" signal is determined by a Zener diode 218 and the resistive divider formed in circuit 186 (by the 165 k and 16.2 k resistors) and by the resistive divider formed in circuit 188 (by the 383 k and 13.3 k resisters), and is preferably set to detect a voltage below 42 volts in one example. In normal operation when the battery voltage is not "low", the output of the op amp circuit 214 will be high, which turns transistor 216 "on" thereby illuminating LEDs 192A and 192B. Conversely, when the battery voltage is "low" as detected by op amp circuit 214, the output of the op amp circuit 214 will be low thereby turning off transistor 216 and turning off LEDs 192A and 192B.

The overall operation of the circuit will now be described. If there is no battery 180 present, then the drain to source voltage of the FET 194 will go to zero because there is no battery current. Hence, both op amp circuits 200 and 206 will have an output of zero, which removes the voltage at the gate of the FET. Op amp circuit 210 detects the low signal on the gate of the FET, and pulls the "battery present" signal low, which entirely disables the LEDs 190A/B and 192A/B through transistor 212. When no LEDs are lit, this indicates that there is no battery present in the system.

When a battery 180 is present and is charging, the current flows from the source to the drain of the FET 194. This generates a positive voltage on the source, which is amplified by op amp circuit 206. This amplified output signal from op amp circuit 206 drives the gate of the FET, as well as the input to op amp circuit 210 (battery present).

For example, if a charging battery current of 500 ma is flowing through the FET 194 and the "on" resistance of the FET is 0.1 ohms, then 50 mv is present on the source of the FET. This 50 mv is multiplied by 201 (by op amp 206) to obtain approximately 10 volts on the gate of the FET. As the charging battery current through the FET decreases, the amplified gate voltage will also drop. If the gate threshold voltage is 4 volts, then only 20 mv is required on the source. If the gate to source voltage of the FET drops to the range of the gate threshold voltage, the "on resistance" of the FET will rise, which will allow the voltage across the drain to source to remain high enough to allow the battery present sensing even though the current is continuing to decrease. In other words, the "on resistance" of 0.1 ohms is a minimum value of sensing resistance, and the maximum value can be several Megaohms of resistance if the gate to source voltage is less than the threshold voltage but still higher than the battery present sense voltage. Accordingly, the threshold voltage for the input of op amp circuit 210 should be slightly less than 2 volts, in one example. The voltage on the output of op amp 206 can also be used to provide amplified battery current information to other circuitry.

When a battery 180 is present and is discharging, the current flows from the drain to the source of the FET 194. This generates a negative voltage on the source, which is inverted and amplified by op amp circuit 200 to provide a signal to turn the FET fully on, as well as to provide a signal to the input of op amp circuit 210 (battery present) which supplies power to the LEDs. The op amp circuit 200 also drives the base of transistor 202 which activates LEDs 190A and 190B, indicating that the battery 180 is discharging.

When the battery 180 is present and is in a low voltage condition, op amp circuit 214 detects the low voltage and generates an active low signal which turns off transistor 216, thereby turning off LEDs 192A and 192B. This indicates that the voltage of battery 180 is low. Circuitry can be provided which would turn off FET 194 during low voltage conditions.

In one example, the LED 190B illuminates a RED color when active, while LED 192B illuminates a GREEN color when active. In this manner, if the battery voltage is not low (green LED 192B is on) and the battery is discharging (red LED 190B is on), a yellow color is formed to indicate the battery is discharging. If the battery voltage is low (green LED 192B is off) and the battery is discharging (red LED 190B is on), only the red color is lit to indicate a status of low voltage battery discharging. If the battery voltage is not low (green LED 192B is on) and the battery is not discharging (red LED 190B is off), only the green color is lit to indicate the battery is present and charging.

The circuit shown in FIG. 21 utilizes a −48 volt battery and a −54 volt DC main converter voltage. Each op amp, being of the LM324 type in one example, is powered with a supply derived from the battery through zener diode 218. It is understood that the voltages shown in FIG. 21 are by way of example only, and do not limit the scope of the invention disclosed herein.

Ringer Circuit

A conventional "ring" signal is a signal of 85 volts rms at 20 hz with a 50% duty cycle. In conventional circuits, a transformer is used to provide the 85 volt rms signal from a generally lower dc voltage (i.e., a −48 volt DC supply). The transformer is generally a large and expensive part. What is needed is a circuit for generating a ring signal which eliminates the need for a transformer while still providing a reliable "ring" signal.

In accordance with the present invention, a circuit is provided for converting a first dc supply voltage to a periodic ring signal at a higher second voltage suitable for use in a telecommunications system. The circuit includes a boost converter 220, a series switch 222 coupled to the input of the boost converter 220, a timer 224, and a load dumping stage 226.

Figures 22, 23:
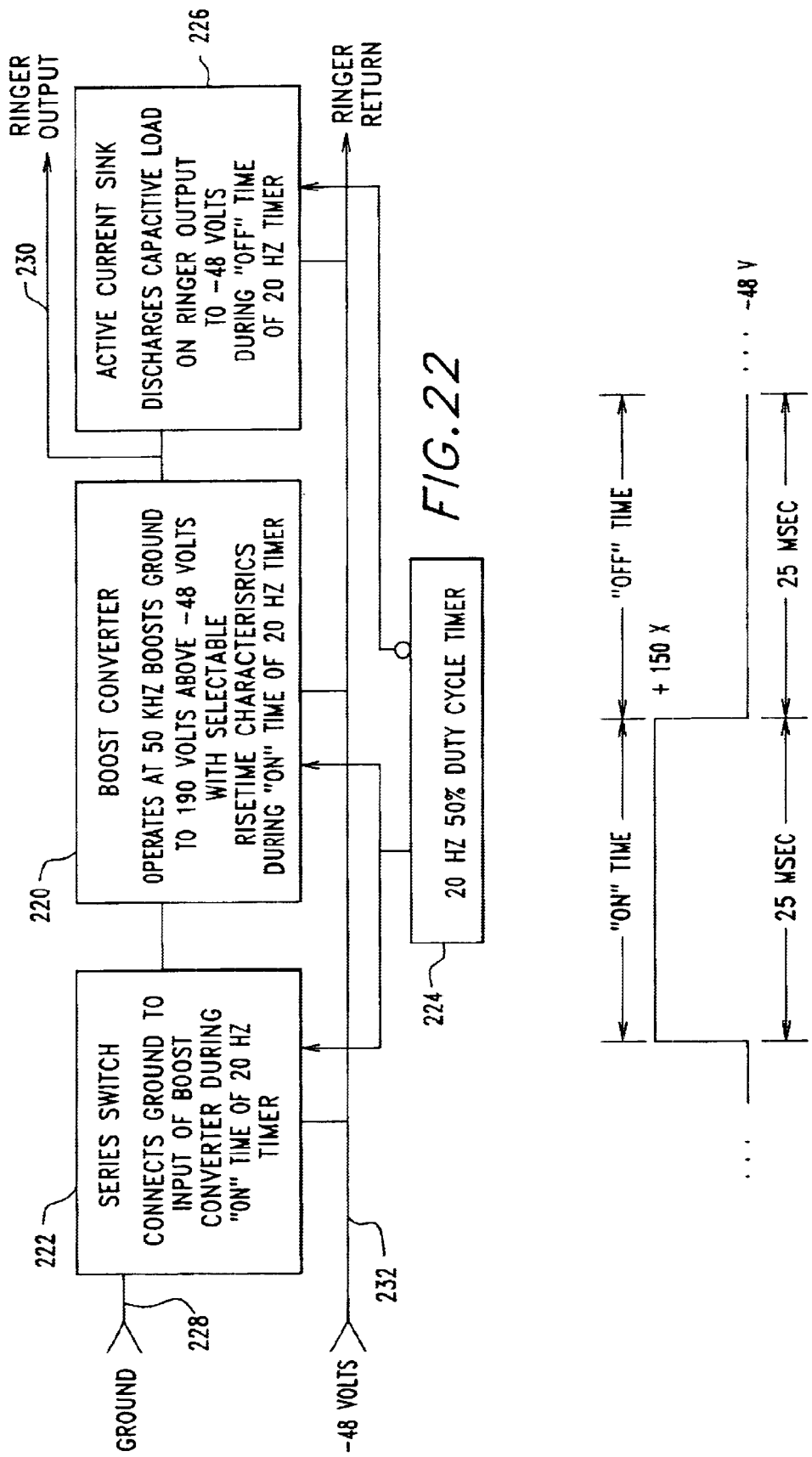
FIG. 22 is a functional block diagram of a ringer circuit of the present invention.
FIG. 23 is a timing diagram of a ringer output signal generated by the ringer circuit of FIG. 22.

FIG. 22 is a block diagram of one embodiment of the present invention for converting a first supply voltage (shown as ground 228) to a "ring" signal 230 at a higher second voltage suitable for use in a telecommunications system. The boost converter 220, also known as a switching power supply, boosts the first supply voltage, shown as ground 228 in FIG. 22, to a higher dc voltage, such as 150 volts dc. In the example shown in FIG. 22, the ground line 228 is actually a positive source of voltage with respect to −48 vdc (shown as reference voltage 232), and hence the boost converter 220 can operate when the ground line 228 is coupled to the input of the boost converter. The boost converter 220, in one example, operates at a switching rate of 50 kHz.

The timer 224 is provided to establish the timebase for the "ring" signal. In one example, the timer 224 is an oscillator tuned to operate at 20 Hz with a 50% duty cycle (i.e., the clock signal is high for 25 msec and low for 25 msec). As shown in FIG. 22, the output of the timer 224 is coupled to the series switch 222, and to the boost converter 220. An inverted output from the timer 224 is coupled to the load dumping stage 226.

The series switch 222, coupled between ground 228 and the boost converter 220, is used to selectively disconnect the ground reference 228 to the input of the boost converter 220 during the "off" time of the 20 Hz timer. In this manner, the boost converter 220 only provides a boosted output voltage during the "on" time of the 20 Hz timer. In other words, the boost converter 220 is effectively disabled through the series switch 222 during the "off" time of the 20 Hz cycle. During the "on" time of the 20 Hz timer, the boost converter 220 is coupled to the ground line 228 (as mentioned above, the ground line 228 is actually a positive source of voltage with respect to −48 vdc), and provides a boosted output signal on the ringer output line 230.

The ringer output waveform, shown in FIG. 23, is an AC type waveform with the characteristic of an output voltage equal to the most negative input voltage during the "off" time of the 20 Hz timer, and an output voltage equal to roughly 190 v above the most negative input voltage during the "on" time. For the purposes of generating this waveform in the example of FIG. 22, the −48 v level, shown as 232 in FIG. 22, is the most negative voltage and is treated in a similar fashion as a normal circuit ground reference. The voltage labeled "ground," shown as 228 in FIG. 22, can actually be viewed as a positive voltage with respect to the −48 volt level. Therefore, during the "on" time of the timer, the ground 228 is connected to the input of the boost converter 220 which provides power to allow the boost converter to generate a high level of output voltage along ringer output line 230. During the "off" time of the timer, the ground input 228 is disconnected from the input of the boost converter 220, thereby allowing the ringer output voltage 230 to drop to the 48 volt level from reference 232.

The load dumping stage 226, coupled between the ringer output 230 and the ringer return path 232, provides a selectable pull-down or current sinking path for the various loads that may be attached to the ringer output line. In particular, the load dumping stage 226 is activated when the boost converter 220 is disabled during the "off" time of the 20 Hz cycle. During this time, the boost converter 220 is disabled and the output of the boost converter (i.e., voltage level of the ringer output 230) is floating. However, the load dumping stage 226 provides a discharge path from the ringer output line 230 to the ringer return line 232 (i.e., −48 v reference) to ensure that the voltage along the ringer output line 230 is set and does not float. Hence, the effect of stray capacitance on the voltage level of the ringer output signal 230 is eliminated by the load dumping stage 226.

In general, one embodiment of the present invention produces the ringer output waveform as shown in FIG. 23. Since the boost converter 220 is disabled during the "off" time of the 20 Hz cycle, and since the load dumping stage 226 discharges any stray capacitance on the ringer output line 230 during this time, the ringer output signal assumes the −48 volt level. During the "on" time of the 20 Hz signal, the load dumping stage 226 releases the ringer output line 230 and the boost converter 220 boosts the ringer output signal to approximately 150 vdc.

Figure 24:
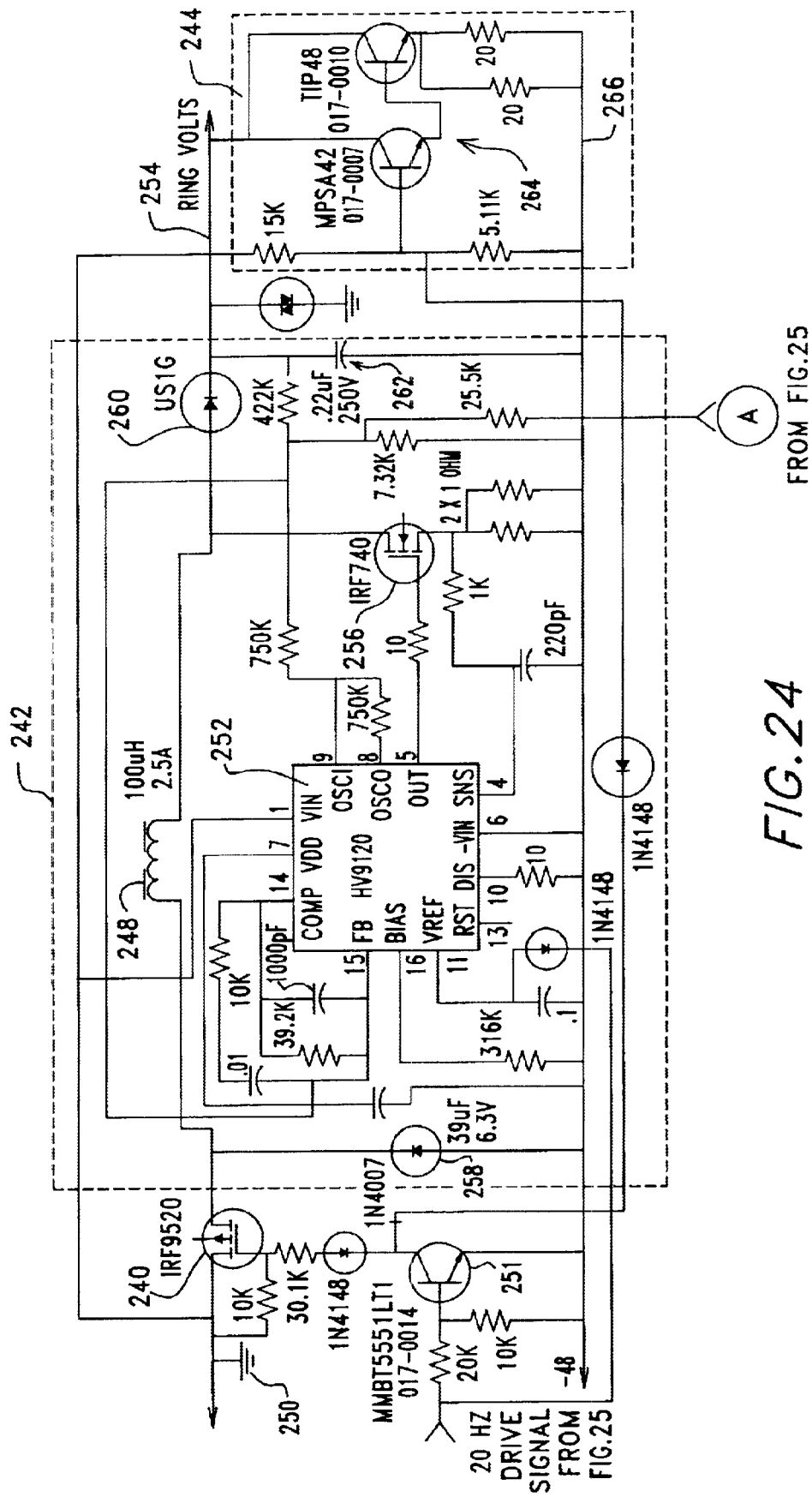
FIG. 24 is a schematic diagram of the ringer circuit of FIG. 22.
Figure 25:
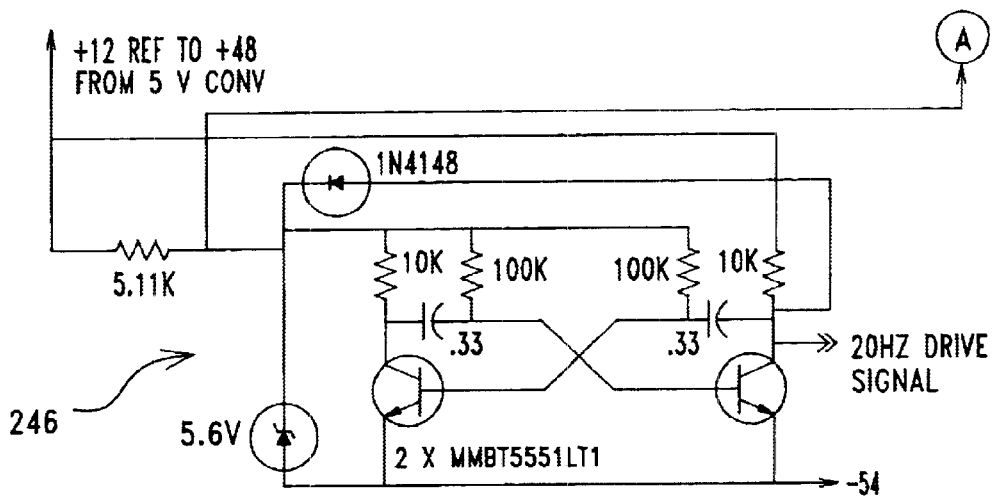
FIG. 25 is a schematic diagram of a 20 Hz. drive circuit of the present invention.

FIGS. 24 and 25 show an example of a circuit to implement the above-described invention. FIG. 24 shows an example of a series switch 240, a boost converter 242, and a load dumping stage 244, while FIG. 25 shows an example of a oscillator circuit 246. Referring to FIG. 24, the switching device 240 is placed in series with the inductor 248 of the boost converter circuit 242, which selectively couples the inductor 248 to ground 250. In one example, the switching device 240 is a p-channel FET, model IRF9520 from International Rectifier, having its gate coupled to the 20 Hz drive signal through a transistor 251.

The boost converter 242 includes a control circuit 252, such as HV 9120 available from Supertex, which is tuned to operate at a 100 KHz clock frequency to achieve a 50 KHz switching frequency. The Supertex chip is also set through external components to achieve the final boost voltage and any particular waveshaping characteristics desired. It also has a maximum current sensing circuit to provide protection in case of a ringer load fault on the ringer output line 254. The boost converter 242 also includes the inductor 248, a boost switch 256, diodes 258 and 260, and a capacitor 262, as shown in FIG. 24, to provide a boosted signal to the ringer output line 254.

The load dumping stage 244 includes, in one example, a set of switching elements 264 configured as selectable high current sinks operating under the control of the 20 Hz drive signal of the oscillator 246 through transistor 251. Switching elements 264 discharge ringer output 254 to the ringer return line 266. FIG. 25 shows an example of the oscillator circuit 246 used to generate the 20 Hz drive timing pulse.

The circuits shown in FIGS. 24 and 25 operate in the following manner. The 20 Hz drive pulse generated by oscillator circuit 246 is fed through the inverting transistor 251 to control the series switch 240, as well as to control the load dumping stage 244. Therefore, when the 20 Hz pulse is high, the series switch 240 is enabled and connects the inductor 248 of the boost converter 242 to the ground reference 250, thereby enabling the boost converter. At the same time, the load dumping stage 244 is disabled which releases the ringer output line 254. Hence, the boost converter 242 provides the boosted "ring" signal to the ringer output line 254 at the appropriate voltage level for 25 msec.

Conversely, when the 20 Hz pulse is low, the series switch 240 is released (disabled) which disconnects the inductor 248 from the ground reference 250 and disables the control circuit 252, thereby disabling the boost converter 242 such that –48 volts appears on the output line 254. The load dumping stage 244 is also enabled and provides a current sink from the ringer output line 254 to the ringer return line 266 to discharge and set the ringer output line 254 to a constant voltage, such as –48 vdc, for 25 msec.

While the circuit of FIGS. 24–25 is shown using a negative 48 volt dc supply, it is understood that these voltages do not limit the scope of the invention.

Faceplate Latching Scheme

Conventionally, rotatable latches, such as PCB extracters, are positioned on the ends of circuit boards or circuit cards adapted for insertion and removal by a user into slots of a card cage. These rotatable latches assist a user in grasping the circuit card and locking the circuit card into the desired slot of the card cage. However, these latches are typically mounted using mounts which are positioned about a quarter of an inch from the end of the circuit card, thereby occupying valuable space on the circuit card. Further, the rotatable latches are multi-piece assemblies which can be expensive, require secondary assembly operations, and may pose reliability concerns. Hence, what is needed is an apparatus for securing a circuit card to a card cage which minimizes the space occupied on the circuit card for mounting the apparatus.

Figure 26:
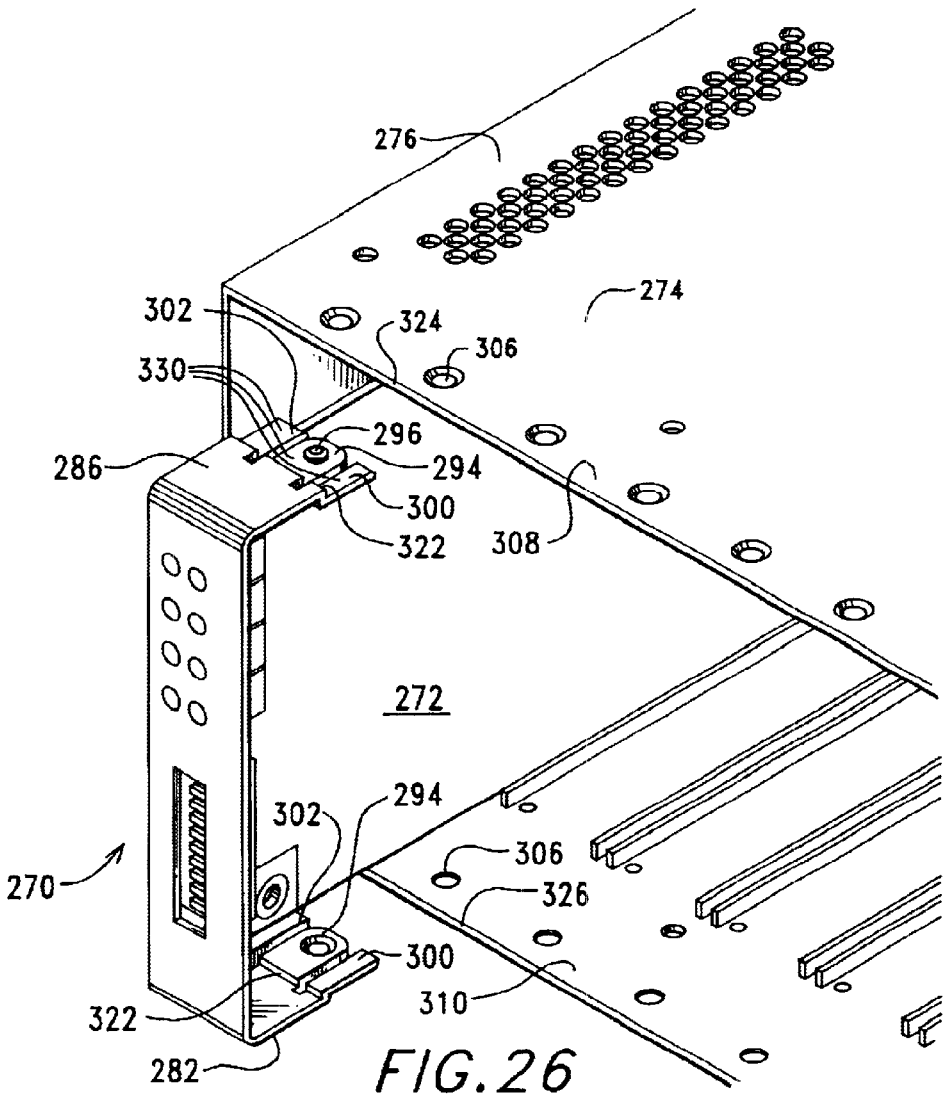
FIG. 26 is a close-up perspective view of a faceplate on a circuit card of the telecommunication device of FIG. 1.
Figure 27:
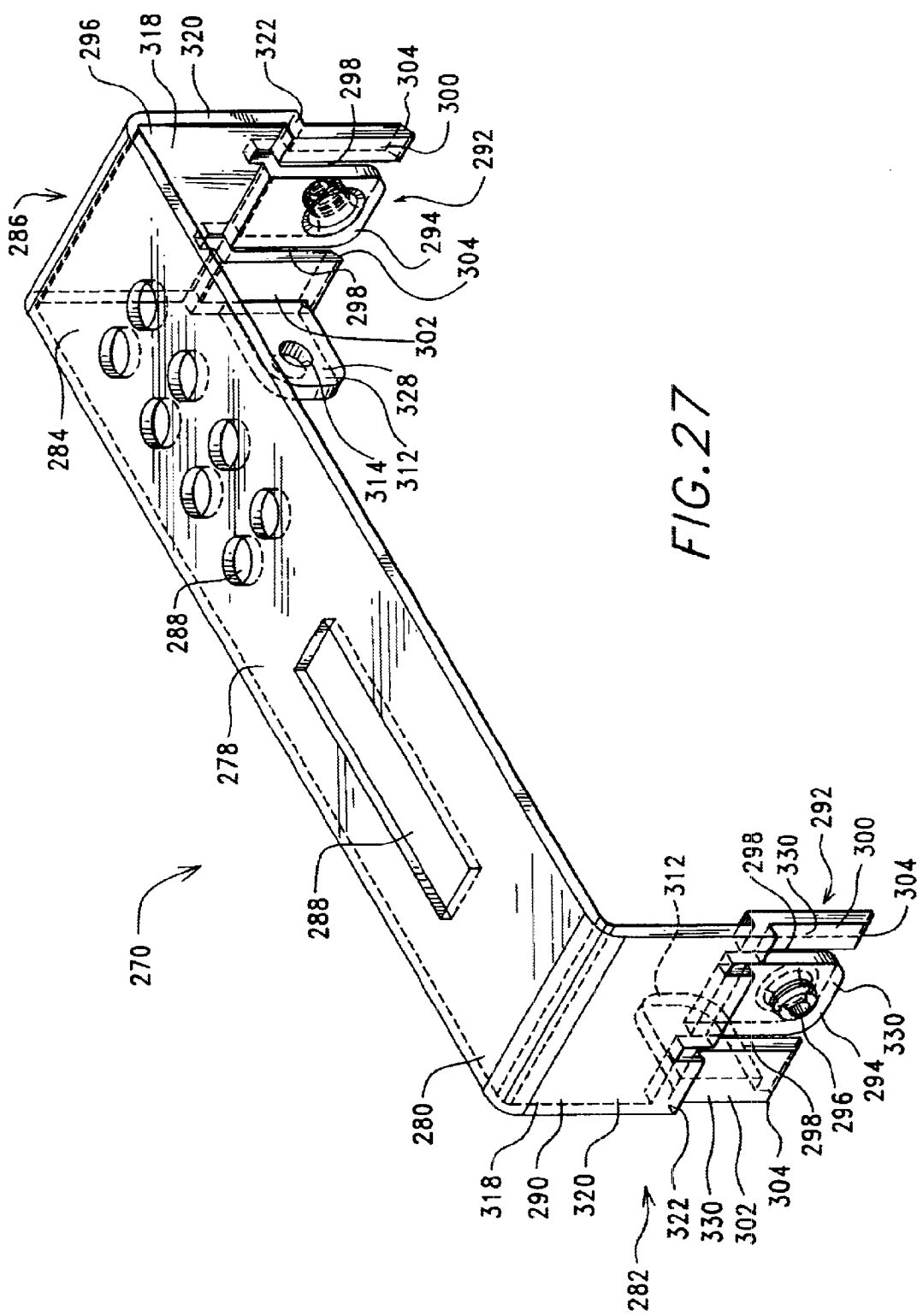
FIG. 27 is a further enlarged perspective view of the faceplate of FIG. 26.
Figure 28:
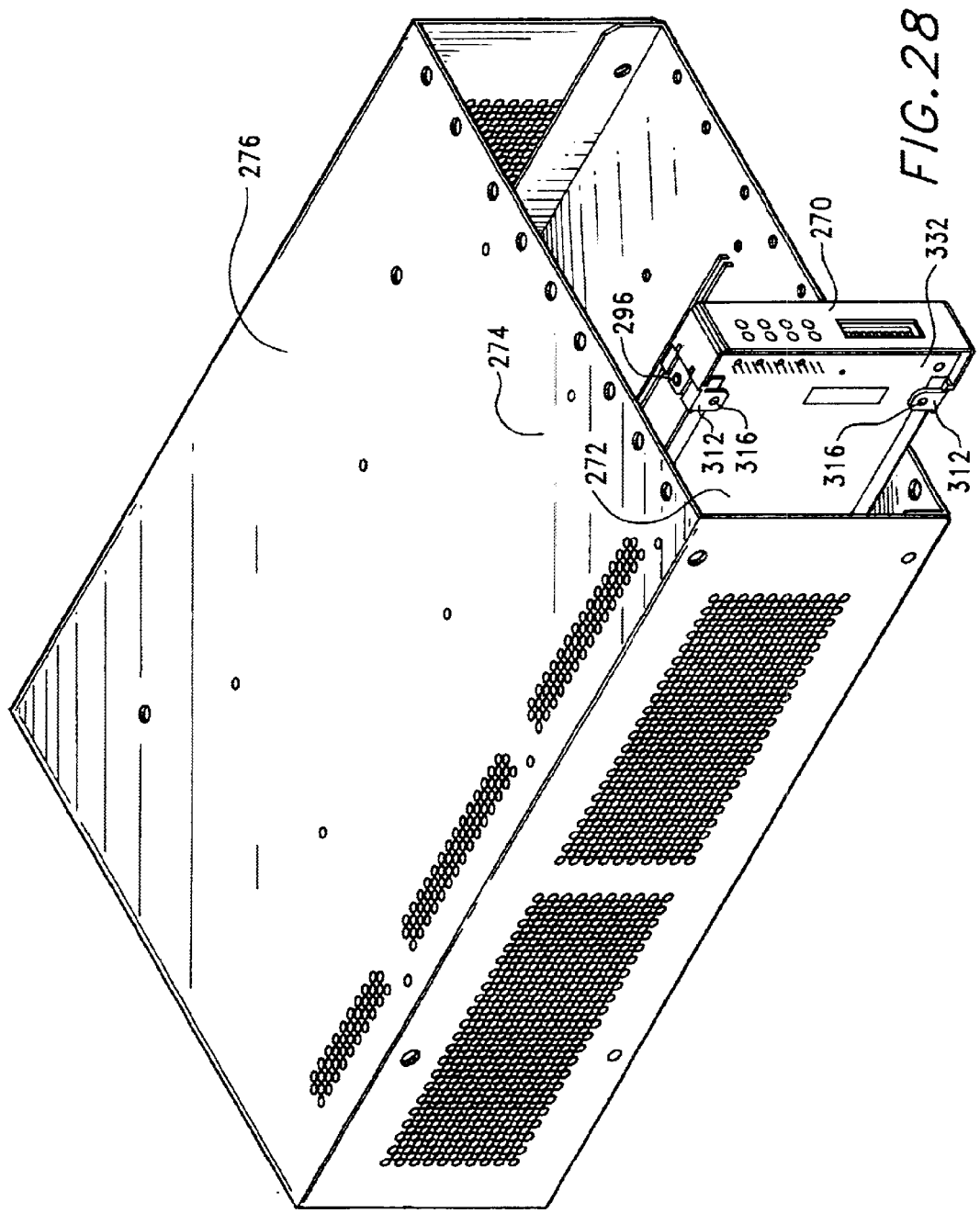
FIG. 28 is a perspective view of the faceplate and circuit card of FIG. 26.

In accordance with embodiments of the present invention and as shown in FIGS. 26–28, a bracket 270 is disclosed which is adapted to be mounted to the end of a circuit card or circuit board 272 and removeably secured to the housing 274 of a card cage 276. In one example and referring to FIG. 27, the bracket 270 is generally U-shaped, having a central portion 278 with a first end 280 coupled to a first end portion 282, and a second end 284 coupled to a second end portion 286. The central portion 278 is generally rectangular in shape, and can be used as a face plate having various apertures 288 or other indicia depending on the application. The central portion 278 also provides a protective surface which prevents accidental contact of foreign objects with the components on the circuit card 272 when the circuit card is secured within the card cage 276.

At the first end 280 of the central portion 278, the first end portion 282 is coupled to the central portion 278 at approximately a 90 degree angle. At the second end 284 of the central portion 278, the second end portion 286 is also coupled to the central portion 278 at approximately a 90 degree angle. In one example, the central portion 278 and the first and second end portions 282, 286 are made from a single piece of sheet metal and stamped into the configuration shown in FIGS. 26–28.

In one example and referring to FIG. 27, the first and second end portions 282, 286 are substantially identical, and each have a base portion 290 and a finger portion 292. On their distal ends, the finger portions 292 have a center finger 294 which has an outwardly facing protrusion 296 thereon. The center finger 294 is curved about its free distal end and is defined by a pair of parallel slots 298 therealong. These parallel slots 298 also define a pair of outer fingers 300, 302 which each have a chamfered surface 304, for example at 45 degrees, along their outer surface at their free distal ends.

Referring to FIG. 26, the protrusions 296 of the center fingers 294 are adapted to mate with dimples or apertures 306 positioned respectively along the upper and lower surfaces 308, 310 of the card cage 276. The pair of parallel slots 298 provide a relief about the center finger 294. The center finger 294 and the pair of outer fingers 300, 302 on each end portion 282, 286 are resilient in that when positioned within the respective location in the card cage 276, the fingers 294, 300, 302 exert an outward force which tends to secure and retain the bracket 270 in a fixed position, and the protrusions 196 within apertures 306, until the user applies a compressive force to remove the bracket 270 from the card cage 276.

An inwardly extending tab 312 (FIG. 27) having an aperture 314 therethrough is provided at one of the outer fingers 302 of each of the first and second end portions 282, 286 of the bracket 270. The tab 312 is oriented 90 degrees from the surface of the outer finger 302 to which the tab 312 is coupled. The tab 312 provides a surface through which the bracket 270 can be secured to the circuit card 272, using a screw, ribbed screw or post or the like (see 316 in FIG. 28).

Referring to FIG. 27, one end 318 of the base portions 290 of the first and second ends 282, 286 is coupled to the respective ends 280, 284 of the central portion 278 of the bracket. At the other end 320 of the base portion 290, the base portion is coupled to the finger portions 292, including the center finger 294 and the two outer fingers 300, 302. In one example, the center finger 294 and the two outer fingers 300, 302 are recessed inwardly to form a shoulder 322. The shoulder 322 is adapted to mate with the upper and lower edges 324, 326 of the card cage 276, thereby orienting and assisting to maintain the bracket 270 in a fixed position with respect to the card cage. The amount of recess of center fingers 294 and the two outer fingers 300, 302 will depend on the distance between the upper and lower interior surfaces of the card cage 276 so that a snug interference fit is achieved. Further, since the parallel slots 298 are cut through the shoulder 322, the center finger 294 is able to deflect when an inwardly compressive force is applied thereto.

The bracket 270 is generally coated with a non-conductive paint. However, in one example, the interior surface 328 of the tabs 312 and the exterior surfaces 330 of the fingers 294, 300, 302 (see FIGS. 26–27) are left uncoated so that a conductive electrical connection can be formed between the circuit card 272, the bracket 270, and the card cage chassis 276. Further, the contact region between the bracket 270 and the interior of chassis 276 is enlarged due to the increased surface area of the center finger 294 and outer fingers 294, 300, 302. In this manner, the stray electromagnetic signals coupled to the bracket 270 can be dissipated to the chassis ground of the card cage 276, thereby forming a good EMI seal and reducing electromagnetic interference.

In one example of the present invention, the central portion 278 of the bracket 270 is sized approximately so that a user can clasp and compress the bracket by the first and second end portions 282, 286 between the user's thumb and fingers. This provides an ergonomic benefit in that the user can insert or remove a circuit board, using the bracket 270 of the present invention, into/out of the card cage using only a single hand.

As can be seen in FIG. 28, the bracket 270 of the present invention permits the end portions 332 on the surface of the circuit board 272 to be used for the mounting of electrical or other components, as the bracket 270 only uses a small portion of space on the circuit card 272 for attachment. Further, the bracket 270 of the present invention eliminates the need for moving parts, such as the conventional retaining latches which rotate about a pin.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. A telecommunication device, comprising:
  a controller circuit, and
  a plurality of telecommunication circuits electrically connectable to the controller circuit;
  wherein each telecommunication circuit receives both real time signaling information and non-real time control and status information from the controller circuit in bytes of data via a first TDM signal passed from the controller to the telecommunication circuits and transmits both real time signaling information and non-real time control and status information to the controller circuit in bytes of data via a second TDM signal passed from the telecommunication circuits to the controller, and further wherein at least one bit in each byte of data indicates whether real time or non-real time information is included therein.

2. A telecommunication device as defined in claim 1, wherein each byte includes a nibble of data and a nibble of control information.

3. A telecommunication device as defined in claim 2, wherein the nibble of control information for bytes including non-real time control and status information includes flow control information.

4. A telecommunication device, comprising:
  a controller circuit;
  a plurality of telecommunication circuits;
  each telecommunications circuit being carried by one of a plurality of circuit cards;
  a plurality of circuit card mounting slots;
  each circuit card mounting slot including an electrical connector into which one of said circuit cards may be inserted for electrical connection of a telecommunication circuit to said controller circuit;
  wherein each telecommunication circuit whose circuit card is inserted into an electrical connector receives a first TDM signal containing control/status information from said controller circuit;
  wherein each of said telecommunications circuits whose circuit card is inserted into an electrical connector transmits a second TDM signal containing control/status information to said controller circuit;
  wherein each of said telecommunication circuits receiving said first TDM signal determines (a) where within said first TDM signal to find control/status information relating to said telecommunication circuit, and (b) where within said second TDM signal to insert control/status information relating to said telecommunication circuit, based upon a location-signal that is received from an electrical connector into which a circuit card carrying said telecommunication circuit is inserted;
  wherein a third TDM signal is transmitted to said controller circuit from each of said telecommunication circuits whose circuit card is inserted into an electrical connector;
  each of said third TDM signals having a time slot that is unique to each of said telecommunication circuits whose circuit card is inserted into an electrical connector; and
  wherein each of said third TDM signals indicates (a) that a circuit card is present in a corresponding electrical connector, and (b) a type of communication protocol to be used for a corresponding telecommunication circuit.

5. The telecommunication device defined in claim 4 wherein each of said location-signals is a parallel multi-bit address.

6. A telecommunication device, comprising:
  a controller card for receiving external commands that originate external to said telecommunications device;
  a microprocessor on said controller card;
  a backplane on said controller card;
  a plurality of card slots on said backplane;
  a plurality of telecommunication cards individually electrically connectable to said controller card by mounting one of said telecommunication cards in one of said card slots;
  first-software residing in said microprocessor including (1) a plurality of card-managers, one card manager being established for each card slot having a telecommunication card mounted therein, and (2) a slot-message-manager for centralizing communications with each of said card slots;
  each of said card-managers communicating with an associated card slot through said slot-message-manager to thereby manage a functionality of a telecommunication card that is mounted in said associated card slot;
  wherein each of said plurality of telecommunication cards can be a different type of telecommunication card;
  wherein each of said card-managers is a type of card-manager corresponding to a type of telecommunication card for which each of said card-managers was established;
  one or more tributaries on each of said telecommunications cards; and
  second-software residing in said microprocessor for converting between an external command address for a tributary on one of said telecommunications cards and an internal address for said tributary that is relatively more detailed than said external command address, said internal address being scaleable to accommodate addresses of various lengths.

* * * * *